US011223309B2

(12) United States Patent
Yoshikawa et al.

(10) Patent No.: US 11,223,309 B2
(45) Date of Patent: Jan. 11, 2022

(54) MOTOR CONTROL DEVICE, METHOD OF ESTIMATING INITIAL POSITION OF MAGNETIC POLE OF ROTOR, AND IMAGE FORMING APPARATUS

(71) Applicant: KONICA MINOLTA, INC., Tokyo (JP)

(72) Inventors: Hiroyuki Yoshikawa, Toyohashi (JP); Yuta Tachibana, Toyokawa (JP); Yuji Kobayashi, Toyohashi (JP); Kazumichi Yoshida, Toyokawa (JP); Daichi Suzuki, Toyokawa (JP); Harumitsu Fujimori, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 59 days.

(21) Appl. No.: 16/794,043

(22) Filed: Feb. 18, 2020

(65) Prior Publication Data
US 2020/0295688 A1 Sep. 17, 2020

(30) Foreign Application Priority Data

Mar. 13, 2019 (JP) .............................. JP2019-045591

(51) Int. Cl.
H02P 21/18 (2016.01)
H02P 21/22 (2016.01)
(Continued)

(52) U.S. Cl.
CPC ......... H02P 21/18 (2016.02); G03G 15/6502 (2013.01); H02P 21/22 (2016.02);
(Continued)

(58) Field of Classification Search
CPC ................................ H02P 21/18; H02P 21/22
(Continued)

(56) References Cited

U.S. PATENT DOCUMENTS 4,876,491 A 10/1989 Squires et al.
6,121,736 A * 9/2000 Narazaki ................. H02P 6/182
318/400.02
(Continued)

FOREIGN PATENT DOCUMENTS

JP 2547778 B2 10/1996

OTHER PUBLICATIONS

U.S. Appl. No. 16/737,093; First Named Inventor: Daichi Suzuki; Title: "Motor Control Device, Image Forming Apparatus, and Method for Estimating Initial Position of Magnetic Pole of Rotor", filed Jan. 8, 2020.

Primary Examiner — David Luo
(74) Attorney, Agent, or Firm — Holtz, Holtz & Volek PC

(57) ABSTRACT

In a motor control device that controls a sensorless-type motor, a controller estimates an initial magnetic pole position of a rotor of a motor by an inductive sensing scheme while sequentially setting a plurality of energization angles. At each of the set energization angles, the controller converts peak values of currents flowing through a plurality of phases of a stator winding into a first current component having an electrical angle that is equal to a corresponding one of the set energization angles and a second current component that is different in electrical angle by 90 degrees from the first current component, to correct the first current component based on the second current component. The controller estimates the initial magnetic pole position of the rotor based on the corrected first current component that is obtained at each of the set energization angles.

13 Claims, 26 Drawing Sheets

(51) Int. Cl.
*H02P 27/12* (2006.01)
*G03G 15/00* (2006.01)
*H02P 21/34* (2016.01)

(52) U.S. Cl.
CPC .............. *H02P 21/34* (2016.02); *H02P 27/12* (2013.01); *H02P 2203/03* (2013.01)

(58) Field of Classification Search
USPC .............................. 318/400.02, 400.01, 700
See application file for complete search history.

(56) References Cited

U.S. PATENT DOCUMENTS

| | | |
|---|---|---|
| 9,201,361 B2 | 12/2015 | Fujimori |
| 9,774,284 B2 * | 9/2017 | Liu .................... H02P 21/18 |
| 10,141,878 B2 | 11/2018 | Suzuki et al. |
| 2018/0144484 A1 | 5/2018 | Kato et al. |

* cited by examiner

MOTOR CONTROL DEVICE, METHOD OF ESTIMATING INITIAL POSITION OF MAGNETIC POLE OF ROTOR, AND IMAGE FORMING APPARATUS

The entire disclosure of Japanese Patent Application No. 2019-045591, filed on Mar. 13, 2019, is incorporated herein by reference in its entirety.

BACKGROUND

Technological Field

The present disclosure relates to a motor control device, a method of estimating an initial position of a magnetic pole of a rotor, and an image forming apparatus, and is used for controlling an alternating-current (AC) motor such as a sensorless-type brushless direct-current (DC) motor (also referred to as a permanent magnet synchronous motor).

Description of the Related Art

A sensorless-type brushless DC motor does not include a sensor for detecting a magnetic pole position of a permanent magnet of a rotor with respect to each phase coil of a stator. Thus, in general, before starting the motor, a stator is energized at a prescribed electrical angle so as to pull the magnetic pole of the rotor to a position in accordance with the energized electrical angle (hereinafter also referred to as an energization angle), and subsequently start the rotation of the motor.

When the rotor is to be pulled, however, the rotor is pulled while being displaced by up to ±180°. Thus, the rotor may vibrate greatly. In such a case, it is necessary to wait until the vibrations are reduced to the level at which the motor can be started.

Furthermore, in the application that does not allow the rotor to move before starting the motor, a method of pulling the rotor cannot be employed. For example, when a brushless DC motor is adopted as a motor for paper feeding for conveyance of paper in an electrophotographic-type image forming apparatus, a method of pulling a rotor cannot be employed for estimating the initial position of the magnetic pole, which is due to the following reason. Specifically, when the rotor is moved before starting the motor, a sheet of paper is fed accordingly, which leads to jamming.

Thus, an inductive sensing method (for example, see Japanese Patent No. 2547778) is known as a method of estimating a magnetic pole position of a rotor in the rest state without pulling the rotor. The method of estimating an initial position utilizes the property of an effective inductance that slightly changes in accordance with the positional relation between the magnetic pole position of the rotor and the current magnetic field by the stator winding when the stator winding is applied with a voltage at a level not causing rotation of the rotor at a plurality of electrical angles. Specifically, according to Japanese Patent No. 2547778, the position of the magnetic pole of the rotor is indicated by the energization angle showing the highest current value at the time when the stator winding is applied with a voltage at each electrical angle for a prescribed energization time period.

SUMMARY

One problem of the above-mentioned initial position estimation method lies in that an error occurs in the estimation result depending on the structure and the characteristics of the motor. Specifically, when the electrical properties and the magnetic properties each are different among the phases of the stator winding, the energization angle at which the peak value of the stator current is detected may not correspond to the magnetic pole position of the rotor. Specific examples will be described in the embodiments.

The present disclosure has been made in consideration of the above-described problem in an inductive sensing scheme. An object of the present disclosure is to allow an initial position of a magnetic pole to be estimated more accurately than conventional cases by an inductive sensing scheme in a sensorless-type motor driven with voltages in a plurality of phases. The other objects and features of the present disclosure will be clarified in the embodiments.

To achieve at least one of the above-mentioned objects, according to an aspect of the present invention, a motor control device that controls a motor of a sensorless type reflecting one aspect of the present invention comprises: a drive circuit that applies a voltage to each of a plurality of phases of a stator winding of the motor; and a controller that controls the drive circuit. When the controller estimates an initial magnetic pole position of a rotor of the motor, the controller: while sequentially setting a plurality of energization angles, causes the drive circuit to continuously or intermittently apply a voltage to the stator winding at each of the set energization angles, and at a voltage value and for an energization time period, the voltage value and the energization time period being set such that the rotor does not rotate; at each of the set energization angles, converts peak values of currents flowing through the phases of the stator winding into a first current component having an electrical angle that is equal to a corresponding one of the set energization angles and a second current component that is different in electrical angle by 90 degrees from the first current component; calculates a first corrected current component by correcting the first current component based on the second current component; and estimates the initial magnetic pole position of the rotor based on the first corrected current component obtained at each of the set energization angles.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 26 is a flowchart for illustrating the timing of creating calibration data after a power supply of the image forming apparatus is turned on.

DETAILED DESCRIPTION OF EMBODIMENTS

Figure 1:
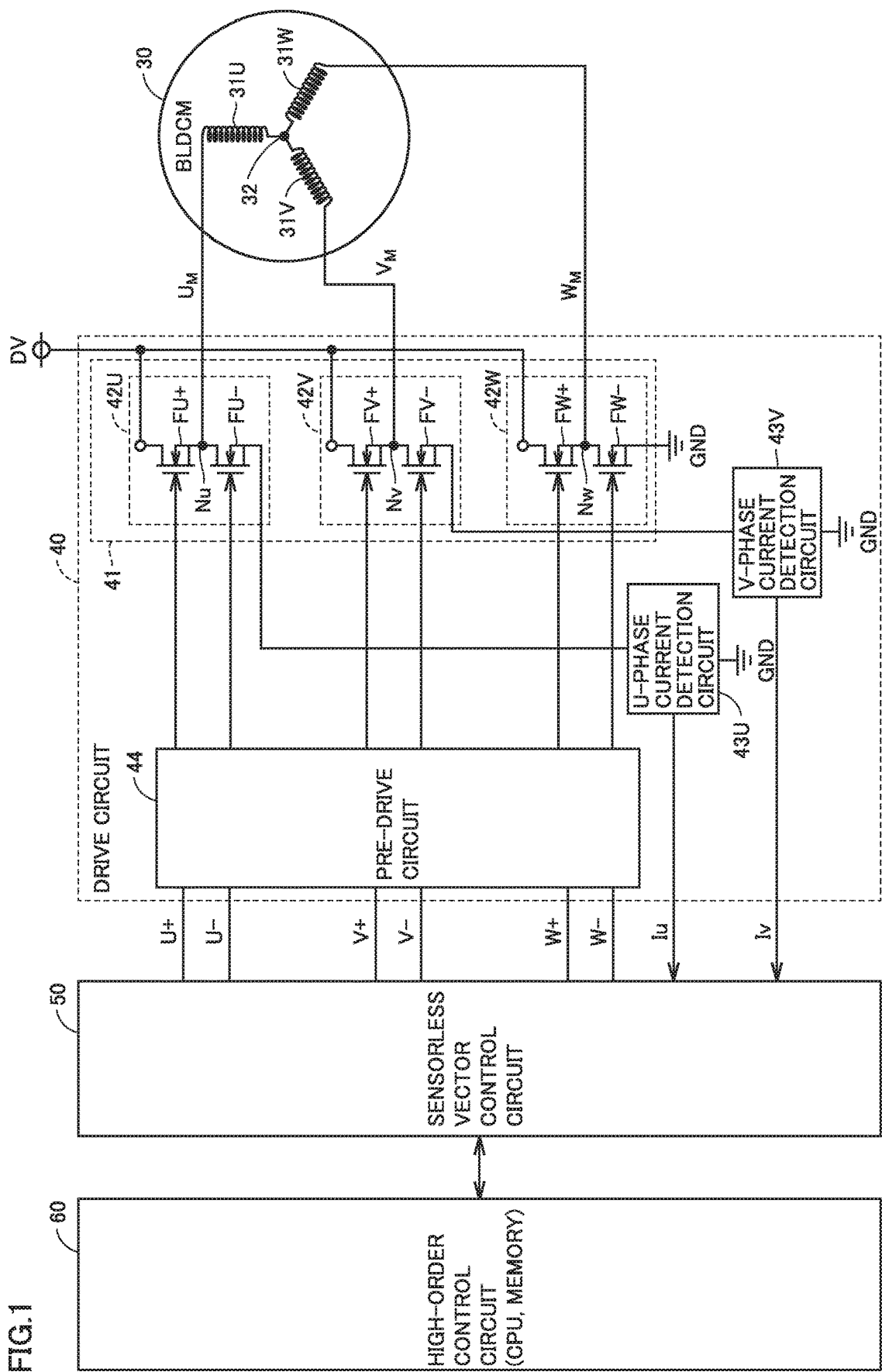
FIG. 1 is a block diagram showing the entire configuration of a motor control device.

Hereinafter, one or more embodiments of the present invention will be described with reference to the drawings. However, the scope of the invention is not limited to the disclosed embodiments.

While a brushless DC motor will be hereinafter described by way of example, the present disclosure is applicable to a sensorless-type AC motor driven by voltages in a plurality of phases. A brushless DC motor is also a type of an AC motor. The same or corresponding components will be denoted by the same reference characters, and description thereof will not be repeated.

First Embodiment

[Entire Configuration of Motor Control Device]

FIG. 1 is a block diagram showing the entire configuration of a motor control device. The motor control device controls driving of a sensorless-type three-phase brushless DC motor (BLDCM) 30. As shown in FIG. 1, the motor control device includes a drive circuit 40, a sensorless vector control circuit 50, and a high-order control circuit 60. Due to a sensorless-type, a Hall element or an encoder for detecting the rotation position of a rotor is not provided.

Drive circuit 40 is an inverter circuit in a pulse width modulation (PWM) control system. Drive circuit 40 converts a direct-current (DC) drive voltage DV into a three-phase AC voltage, and outputs the converted three-phase AC voltage. Specifically, based on inverter drive signals U+, U−, V+, V−, W+, and W− as PWM signals received from sensorless vector control circuit 50, drive circuit 40 supplies a U-phase voltage $U_M$, a V-phase voltage $V_M$, and a W-phase voltage $W_M$ to brushless DC motor 30. Drive circuit 40 includes an inverter circuit 41, a U-phase current detection circuit 43U, a V-phase current detection circuit 43V, and a pre-drive circuit 44.

Inverter circuit 41 includes a U-phase arm circuit 42U, a V-phase arm circuit 42V, and a W-phase arm circuit 42W. These arm circuits 42U, 42V, and 42W are connected in parallel with one another between the node receiving a DC drive voltage DV and the node receiving a ground voltage GND. For simplifying the following description, the node receiving DC drive voltage DV may be referred to as a drive voltage node DV while the node receiving ground voltage GND may be referred to as a ground node GND.

U-phase arm circuit 42U includes a U-phase transistor FU+ on the high potential side and a U-phase transistor FU− on the low potential side that are connected in series to each other. A connection node Nu between U-phase transistors FU+ and FU− is connected to one end of a U-phase winding 31U of brushless DC motor 30. The other end of U-phase winding 31U is connected to a neutral point 32.

As shown in FIG. 1, a U-phase winding 31U, a V-phase winding 31V, and a W-phase winding 31W of brushless DC motor 30 are coupled in a star connection. In the present specification, U-phase winding 31U, V-phase winding 31V, and W-phase winding 31W will be collectively referred to as a stator winding 31.

Similarly, V-phase arm circuit 42V includes a V-phase transistor FV+ on the high potential side and a V-phase transistor FV− on the low potential side that are connected in series to each other. A connection node Nv between V-phase transistors FV+ and FV− is connected to one end of V-phase winding 31V of brushless DC motor 30. The other end of V-phase winding 31V is connected to neutral point 32.

Similarly, W-phase arm circuit 42W includes a W-phase transistor FW+ on the high potential side and a W-phase transistor FW− on the low potential side that are connected in series to each other. A connection node Nw between W-phase transistors FW+ and FW− is connected to one end of W-phase winding 31W of brushless DC motor 30. The other end of W-phase winding 31W is connected to neutral point 32.

U-phase current detection circuit 43U and V-phase current detection circuit 43V serve as circuits for detecting a motor current with a two-shunt method. Specifically, U-phase current detection circuit 43U is connected between U-phase transistor FU– on the low potential side and ground node GND. V-phase current detection circuit 43V is connected between V-phase transistor FV– on the low potential side and ground node GND.

U-phase current detection circuit 43U and V-phase current detection circuit 43V each include a shunt resistance. The resistance value of the shunt resistance is as small as the order of 1/10Ω. Thus, the signal showing a U-phase current Iu detected by U-phase current detection circuit 43U and the signal showing a V-phase current Iv detected by V-phase current detection circuit 43V are amplified by an amplifier (not shown). Then, the signal showing U-phase current Iu and the signal showing V-phase current Iv are analog-to-digital (AD)-converted by an AD converter (not shown) and thereafter fed into sensorless vector control circuit 50.

A W-phase current Iw does not need to be detected since it can be calculated according to Kirchhoff's current rule based on U-phase current Iu and V-phase current Iv, that is, in accordance with Iw=–Iu–Iv. More generally, among U-phase current Iu, V-phase current Iv, and W-phase current Iw, currents of two phases only have to be detected, and the current value of one remaining phase can be calculated from the values of the detected currents of these two phases.

Pre-drive circuit 44 amplifies inverter drive signals U+, U–, V+, V–, W+, and W– that are PWM signals received from sensorless vector control circuit 50 so as to be output to the gates of transistors FU+, FU–, FV+, FV–, FW+, and FW–, respectively.

The types of transistors FU+, FU–, FV+, FV–, FW+, and FW– are not particularly limited, and, for example, may be a metal oxide semiconductor field effect transistor (MOS-FET), may be a bipolar transistor, or may be an insulated gate bipolar transistor (IGBT).

Sensorless vector control circuit 50, which serves as a circuit for vector-controlling brushless DC motor 30, generates inverter drive signals U+, U–, V+, V–, W+, and W–, and supplies the generated signals to drive circuit 40. Furthermore, when brushless DC motor 30 is started, sensorless vector control circuit 50 estimates the initial position of the magnetic pole of the rotor in the rest state by an inductive sensing scheme.

Sensorless vector control circuit 50 may be configured as a dedicated circuit such as an application specific integrated circuit (ASIC), or may be configured to implement its function utilizing a field programmable gate array (FPGA) and/or a microcomputer.

High-order control circuit 60 is configured based on a computer including a central processing unit (CPU), memory, and the like. High-order control circuit 60 outputs a start command, a stop command, a rotation angle speed command value, and the like to sensorless vector control circuit 50.

Unlike the above-described configuration, sensorless vector control circuit 50 and high-order control circuit 60 may be configured as one control circuit by an ASIC, an FPGA or the like. In the present disclosure, sensorless vector control circuit 50 and high-order control circuit 60 will also be collectively referred to as a controller. The controller may refer to sensorless vector control circuit 50 alone or may refer to a whole unit including sensorless vector control circuit 50 and high-order control circuit 60.

[Overview of Motor Operation]

Figure 2:
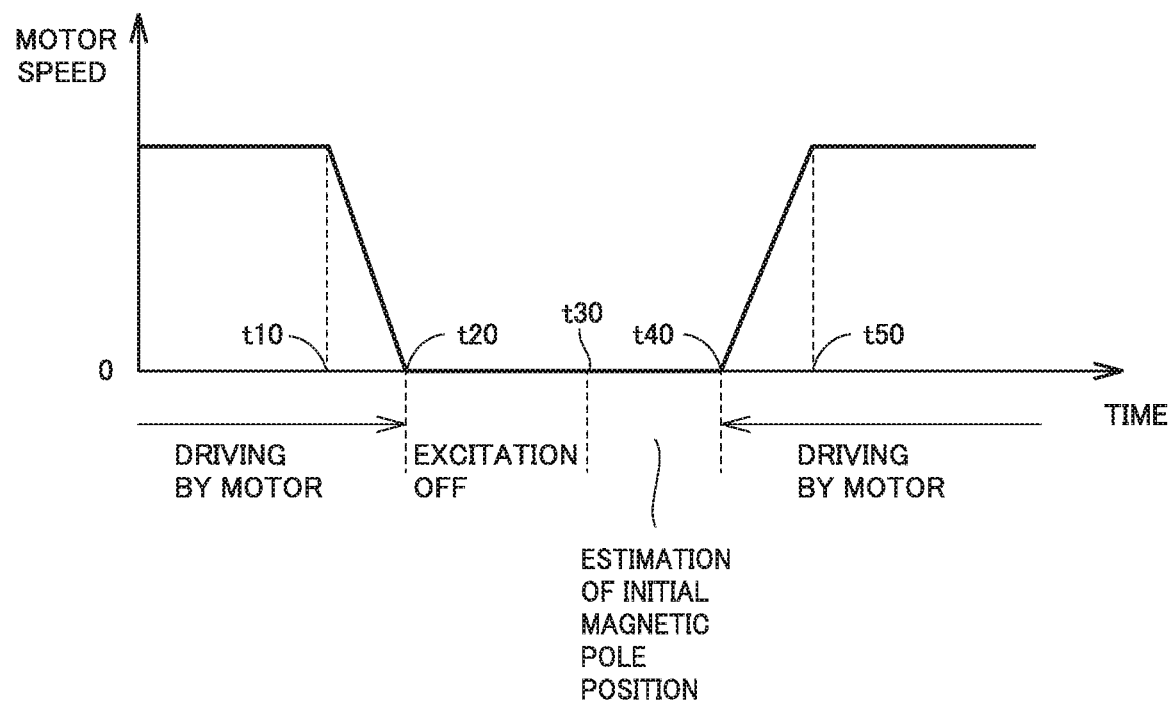
FIG. 2 is a timing chart showing a motor rotation speed in a time period from when a motor in a steady operation is stopped to when the motor is restarted.

FIG. 2 is a timing chart showing a motor rotation speed in a time period from when a motor in a steady operation is stopped to when the motor is restarted. The horizontal axis shows time while the vertical axis shows the rotation speed of the motor.

Referring to FIG. 2, the motor is decelerated in a time period from a time point t10 to a time point t20. Then, at time point t20, rotation of the motor is stopped. Supply of an exciting current to a stator is stopped in a time period from time point t20 to a time point t30.

Before the motor is restarted from a time point t40, the initial position of the magnetic pole of the rotor is estimated in a time period from time point t30 to time point t40. In order to apply a torque in the rotation direction to the rotor, a three-phase AC current needs to be supplied to stator winding 31 at an appropriate electrical angle in accordance with the initial position of the magnetic pole of the rotor. Thereby, the initial position of the magnetic pole of the rotor is estimated. In the present disclosure, an inductive sensing scheme is used as a method of estimating an initial position of a magnetic pole of a rotor.

When rotation of the rotor is started at time point t40, the brushless DC motor is subsequently controlled by a sensorless vector control scheme. The steady operation at a fixed rotation speed is started from a time point t50.

[Coordinate Axes in Sensorless Vector Control Scheme]

Figure 3:
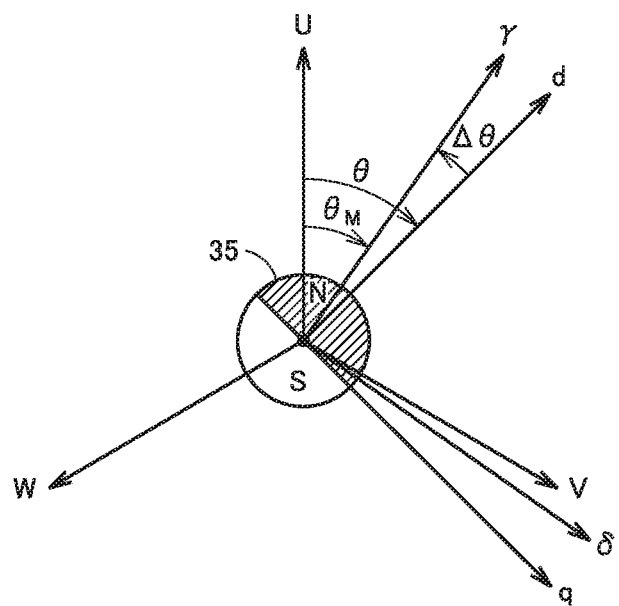
FIG. 3 is a diagram for illustrating coordinate axes for indicating an alternating current and a magnetic pole position in sensorless vector control.

FIG. 3 is a diagram for illustrating coordinate axes for indicating an alternating current and a magnetic pole position in sensorless vector control.

Referring to FIG. 3, in vector control, alternating currents in three phases (a U-phase, a V-phase, a W-phase) flowing through stator winding 31 of three-phase brushless DC motor 30 are variable-transformed into a two-phase component that rotates in synchronization with the permanent magnet of the rotor. Specifically, the direction of the magnetic pole of a rotor 35 is defined as a d-axis, and the direction in which the phase advances at an electrical angle of 90° from the d-axis is defined as a q-axis. Furthermore, the angle of the d-axis from the U-phase coordinate axis is defined as θ.

In the case of a sensorless vector control scheme as a control scheme not utilizing a position sensor for detecting the rotation angle of the rotor, the position information showing the rotation angle of the rotor needs to be estimated by a certain method. The estimated magnetic pole direction is defined as a γ-axis while the direction in which the phase advances at an electrical angle of 90° from the γ-axis is defined as a δ-axis. The angle of the γ-axis from the U-phase coordinate axis is defined as $θ_M$. The delay of $θ_M$ with respect to θ is defined as Δθ.

The coordinate axis in FIG. 3 is used also when the initial position of the magnetic pole of the rotor in the rest state is estimated in an inductive sensing scheme at the time when the motor is started. In this case, the true position of the magnetic pole of the rotor is indicated by an electrical angle θ. The electrical angle of the current that flows through stator winding 31 for estimating the initial position of the magnetic pole is indicated by $θ_M$. Electrical angle $θ_M$ during energization is also referred to as an energization angle or a voltage application angle.

[Vector Control during Motor Operation]

Figure 4:
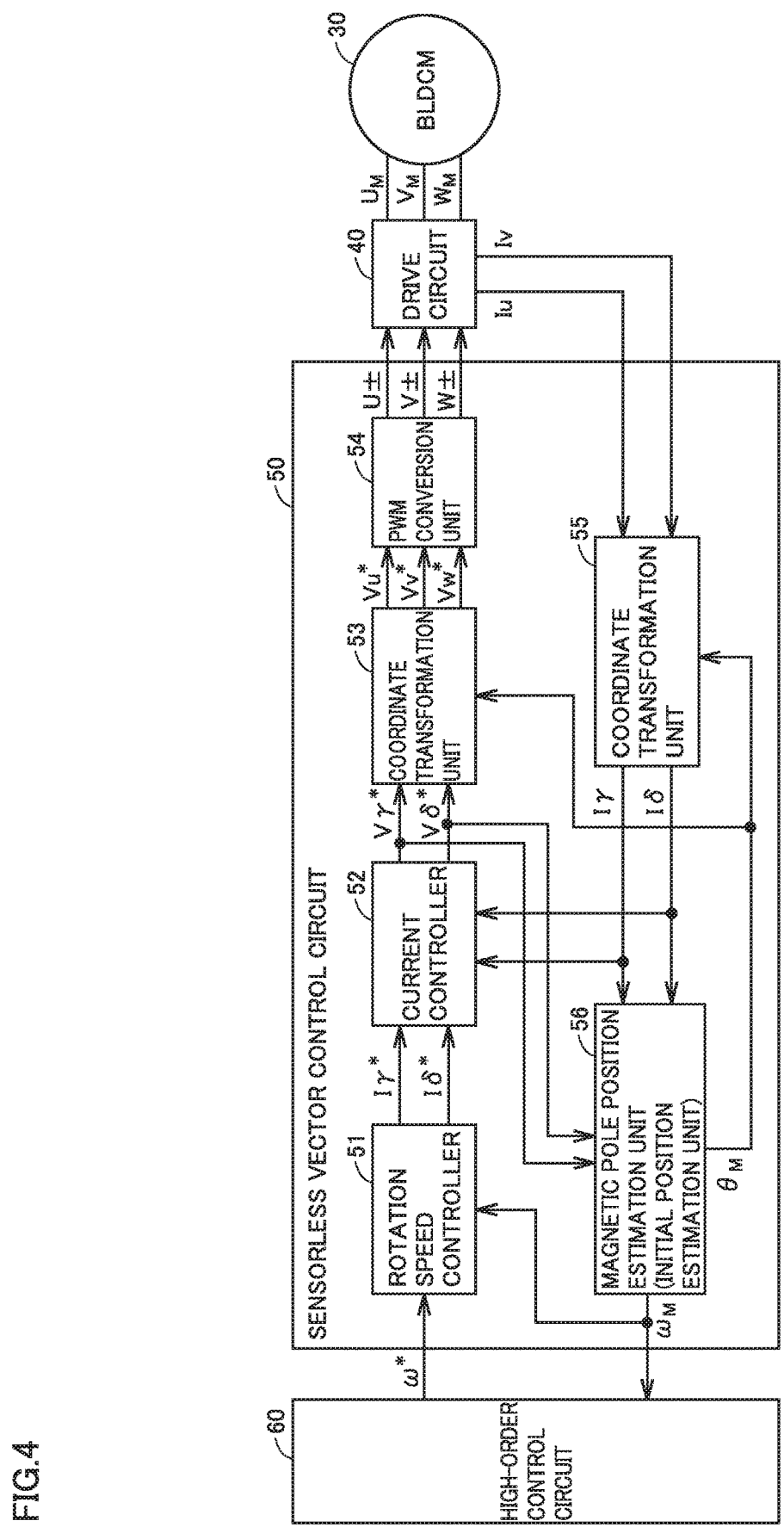
FIG. 4 is a functional block diagram showing the operation of a sensorless vector control circuit during an operation of the motor.

FIG. 4 is a functional block diagram showing the operation of a sensorless vector control circuit during an operation of the motor. In the following, the operation of sensorless vector control circuit 50 during the motor operation will be simply described with reference to FIG. 4.

Sensorless vector control circuit 50 includes a coordinate transformation unit 55, a rotation speed controller 51, a current controller 52, a coordinate transformation unit 53, a PWM conversion unit 54, and a magnetic pole position estimation unit 56.

Coordinate transformation unit 55 receives a signal showing U-phase current Iu detected in U-phase current detection circuit 43U of drive circuit 40 and a signal showing V-phase current Iv detected in V-phase current detection circuit 43V of drive circuit 40. Coordinate transformation unit 55 calculates W-phase current Iw from U-phase current Iu and V-phase current Iv. Then, coordinate transformation unit 55 performs coordinate transformation of U-phase current Iu, V-phase current Iv, and W-phase current Iw to thereby generate a γ-axis current Iγ and a δ-axis current Iδ. This is performed specifically according to the following procedure.

First, according to the following equation (1), coordinate transformation unit 55 transforms the currents of three phases including a U-phase, a V-phase, and a W-phase into two-phase currents of an α-axis current Iα and a β-axis current Iβ. This transformation is referred to as Clarke transformation.

$$\begin{pmatrix} I\alpha \\ I\beta \end{pmatrix} = \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} Iu \\ Iv \\ Iw \end{pmatrix} \quad (1)$$

Then, according to the following equation (2), coordinate transformation unit 55 transforms α-axis current Iα and β-axis current Iβ into a γ-axis current Iγ and a δ-axis current Iδ as a rotating system of coordinates. This transformation is referred to as Park transformation. In the following equation (2), $\theta_M$ is an electrical angle of the magnetic pole direction estimated by magnetic pole position estimation unit 56, that is, an angle of the γ-axis from the U-phase coordinate axis.

$$\begin{pmatrix} I\gamma \\ I\delta \end{pmatrix} = \begin{pmatrix} \cos\theta_M & \sin\theta_M \\ -\sin\theta_M & \cos\theta_M \end{pmatrix} \begin{pmatrix} I\alpha \\ I\beta \end{pmatrix} \quad (2)$$

Rotation speed controller 51 receives a start command, a stop command and a target rotation angle speed ω* from high-order control circuit 60. Rotation speed controller 51 determines a γ-axis current command value Iγ* and a δ-axis current command value Iδ* to brushless DC motor 30 based on target rotation angle speed ω* and a rotation angle speed ωm of rotor 35 that is estimated by magnetic pole position estimation unit 56, for example, by proportional-integral (PI) control, proportional-integral-differential (PID) control or the like.

Current controller 52 determines a γ-axis voltage command value Vγ* and a δ-axis voltage command value Vδ*, for example, by PI control, PID control or the like based on γ-axis current command value Iγ* and δ-axis current command value Iδ* that are supplied from rotation speed controller 51, and γ-axis current Iγ and δ-axis current Iδ at present that are supplied from coordinate transformation unit 55.

Coordinate transformation unit 53 receives γ-axis voltage command value Vγ* and δ-axis voltage command value Vδ* from current controller 52. Coordinate transformation unit 53 performs coordinate transformation of γ-axis voltage command value Vγ* and δ-axis voltage command value Vδ*, to thereby generate a U-phase voltage command value Vu*, a V-phase voltage command value Vv*, and a W-phase voltage command value Vw*. This is performed specifically according to the following procedure.

First, according to the following equation (3), coordinate transformation unit 53 transforms γ-axis voltage command value Vγ* and δ-axis voltage command value Vδ* into an α-axis voltage command value Vα* and a β-axis voltage command value Vβ*. This transformation is referred to as reverse Park transformation. In the following equation (3), $\theta_M$ is an electrical angle in the magnetic pole direction estimated by magnetic pole position estimation unit 56, that is, an angle of the γ-axis from the U-phase coordinate axis.

$$\begin{pmatrix} V\alpha^* \\ V\beta^* \end{pmatrix} = \begin{pmatrix} \cos\theta_M & -\sin\theta_M \\ \sin\theta_M & \cos\theta_M \end{pmatrix} \begin{pmatrix} V\gamma^* \\ V\delta^* \end{pmatrix} \quad (3)$$

Then, according to the following equation (4), coordinate transformation unit 53 transforms α-axis voltage command value Vα* and β-axis voltage command value Vβ* into U-phase voltage command value Vu*, V-phase voltage command value Vv*, and W-phase voltage command value Vw* of three phases. This transformation is referred to as reverse Clarke transformation. In addition, transformation of two phases of α and β into three phases of a U-phase, a V-phase, and a W-phase may be performed using space vector transformation in place of reverse Clarke transformation.

$$\begin{pmatrix} Vu^* \\ Vv^* \\ Vw^* \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} V\alpha^* \\ V\beta^* \end{pmatrix} \quad (4)$$

Based on U-phase voltage command value Vu*, V-phase voltage command value Vv* and W-phase voltage command value Vw*, PWM conversion unit 54 generates inverter drive signals U+, U−, V+, V−, W+, and W− as PWM signals for driving the gates of transistors FU+, FU−, FV+, FV−, FW+, and FW−, respectively.

Magnetic pole position estimation unit 56 estimates rotation angle speed $\omega_M$ of rotor 35 at present and an electrical angle $\theta_M$ showing the magnetic pole position of rotor 35 at present based on γ-axis current Iγ and δ-axis current Iδ, and also on γ-axis voltage command value Vγ* and δ-axis voltage command value Vδ*. Specifically, magnetic pole position estimation unit 56 calculates rotation angle speed $\omega_M$ at which the γ-axis induced voltage becomes zero, and estimates electrical angle $\theta_M$ showing the magnetic pole position based on rotation angle speed $\omega_M$. Magnetic pole position estimation unit 56 outputs the estimated rotation angle speed $\omega_M$ to high-order control circuit 60 and also to rotation speed controller 51. Furthermore, magnetic pole position estimation unit 56 outputs the information about electrical angle $\theta_M$ showing the estimated magnetic pole position to coordinate transformation units 53 and 55.

[Estimation of Initial Position of Magnetic Pole of Rotor in Rest State]

Figure 5:
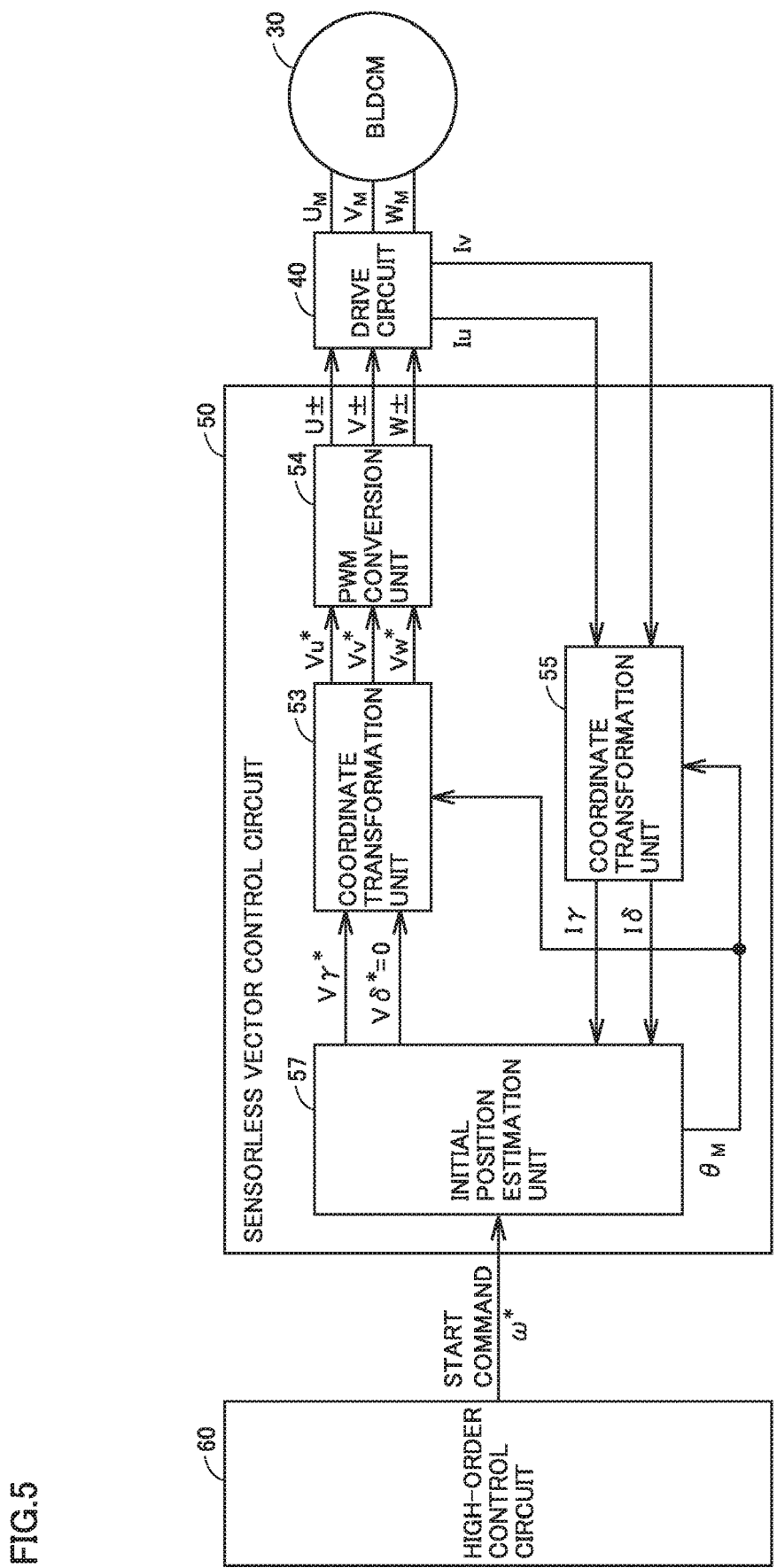
FIG. 5 is a functional block diagram showing a method of estimating an initial position of a magnetic pole of a rotor in the rest state.

FIG. 5 is a functional block diagram showing a method of estimating an initial position of a magnetic pole of a rotor in the rest state.

Since magnetic pole position estimation unit 56 in FIG. 4 utilizes the induced voltage generated in stator winding 31, it cannot be used while the rotor is stopped. Thus, in FIG. 5, an initial position estimation unit 57 for estimating the initial position of the magnetic pole of rotor 35 in an inductive sensing scheme is provided in place of magnetic pole position estimation unit 56.

In this case, in the inductive sensing scheme, a constant voltage is applied continuously or intermittently by PWM to stator winding 31 while sequentially changing a plurality of energization angles, so as to detect a change in the current flowing through stator winding 31 at each energization angle. In this case, the time period of energization to stator winding 31 and the magnitude of the voltage applied to stator winding 31 are set at levels at which rotor 35 does not rotate. When the energization time period is extremely short or the magnitude of the voltage applied is extremely small, the initial position of the magnetic pole cannot be detected, so that attention is required.

As described above, the method of estimating the initial position by inductive sensing utilizes the property of an effective inductance that slightly changes in accordance with the positional relation between the magnetic pole position of the rotor and the current magnetic field by the stator winding when the stator winding is applied with a voltage at a level not causing rotation of the rotor at a plurality of electrical angles.

This change in inductance generally results from the magnetic saturation phenomenon of the iron core of the stator. When a stator current is caused to flow in a d-axis direction corresponding to the direction of the magnetic pole of the rotor, a magnetic flux by a permanent magnet of the rotor and a magnetic flux by the current are added. Thereby, a magnetic saturation occurs to reduce the inductance. Such reduction of the inductance can be detected by a change of the stator current. Furthermore, in the case of an interior permanent magnet (IPM) motor, saliency occurs by which the inductance in the q-axis direction becomes larger than the inductance in the d-axis direction. Thus, in this case, an effective inductance decreases in the case of a d-axis current even if no magnetic saturation occurs.

Specifically, the method often used for detecting the direction of the magnetic pole of the rotor is to set the command values for the energization time period and the applied voltage at each energization angle (specifically, the command value of the γ-axis voltage) to be constant, and detect a peak value of the γ-axis current within the energization time period to thereby determine that the energization angle at which the peak value attains a maximum value (that is, the energization angle at which an effective inductance attains a minimum value) corresponds to the magnetic pole direction.

In the present disclosure, a modification of the above-mentioned method will be further described with reference to FIGS. 9 and 10. According to this modification method, the energization voltage and the applied voltage are limited to the levels at which the motor does not rotate, so that the most probable initial magnetic pole position can be determined even when the energization angle at which a γ-axis peak current obtained at each energization angle attains a maximum value is not clear.

Referring to FIG. 5, sensorless vector control circuit 50 includes initial position estimation unit 57, coordinate transformation unit 53, PWM conversion unit 54, and coordinate transformation unit 55 as functions for estimating the initial position of the magnetic pole of rotor 35. Thus, the initial position of the magnetic pole of the rotor is estimated using a part of the function of vector control described with reference to FIG. 4. In the following, the functions of these units will be described in greater detail.

(1. Setting of γ-Axis Voltage Command Value, Energization Angle and Energization Time Period by Initial Position Estimation Unit)

Initial position estimation unit 57 sets the magnitude of γ-axis voltage command value Vγ*, electrical angle $\theta_M$ (also referred to as energization angle $\theta_M$) of each phase voltage to be applied to stator winding 31, and the energization time period. Initial position estimation unit 57 sets δ-axis voltage command value Vδ* at zero.

The magnitude of γ-axis voltage command value Vγ* and the length of the energization time period are set such that γ-axis current Iγ with a sufficient SN ratio is obtained in the range not causing rotation of rotor 35. Electrical angle $\theta_M$ is set at a plurality of angles in the range from 0 degree to 360 degrees. For example, initial position estimation unit 57 changes electrical angle $\theta_M$ in a range from 0 degree to 360 degrees by 30 degrees.

(2. Coordinate Transformation Unit 53)

Coordinate transformation unit 53 performs coordinate transformation of γ-axis voltage command value Vγ* and δ-axis voltage command value Vδ* (=0), to thereby generate U-phase voltage command value Vu*, V-phase voltage command value Vv*, and W-phase voltage command value Vw*. This coordinate transformation is performed, for example, using reverse Park transformation represented by the above-mentioned equation (3) and reverse Clarke transformation represented by the above-mentioned equation (4).

Specifically, U-phase voltage command value Vu*, V-phase voltage command value Vv*, and W-phase voltage command value Vw* are represented by the following equation (5). In the following equation (5), the amplitude of the voltage command value is defined as $V_0$.

$$\begin{cases} Vu^* = V_0\cos\theta_M \\ Vv^* = V_0\cos(\theta_M - 120°) \\ Vw^* = V_0\cos(\theta_M - 240°) \end{cases} \quad (5)$$

Figure 6:
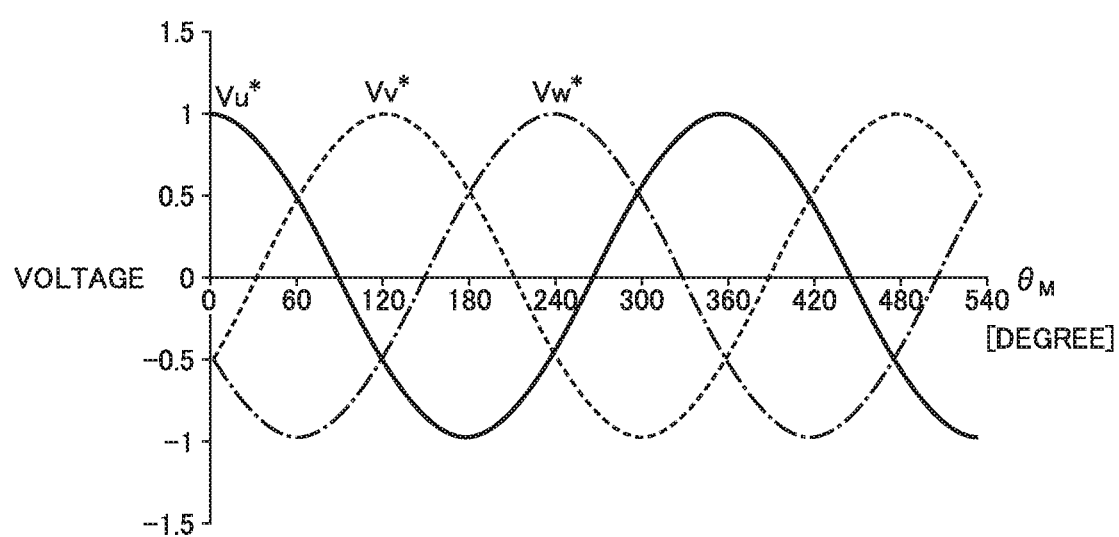
FIG. 6 is a diagram illustrating the relation between an electrical angle and each of a U-phase voltage command value, a V-phase voltage command value and a W-phase voltage command value.

FIG. 6 is a diagram illustrating the relation between the electrical angle and each of the U-phase voltage command value, the V-phase voltage command value and the W-phase voltage command value, shown in the above-mentioned equation (5). In FIG. 6, amplitude $V_0$ of the voltage command value in the above-mentioned equation (5) is normalized to 1.

Referring to FIG. 6, U-phase voltage command value Vu*, V-phase voltage command value Vv*, and W-phase voltage command value Vw* can be set with respect to $\theta_M$ that is arbitrarily set For example, when $\theta_M=0°$, then, Vu*=1 and Vv*=Vw*=−0.5. When $\theta_M=30°$, then, Vu*=(√3)/2, Vv*=0, and Vw*=−(√3)/2.

(3. PWM Conversion Unit 54)

Again referring to FIG. 5, based on U-phase voltage command value Vu*, V-phase voltage command value Vv* and W-phase voltage command value Vw*, PWM conversion unit 54 generates inverter drive signals U+, U−, V+, V−, W+, and W− as PWM signals for driving the gates of transistors FU+, FU−, FV+, FV−, FW+, and FW−, respectively.

According to the generated inverter drive signals U+, U−, V+, V−, W+, and W−, drive circuit 40 supplies U-phase voltage $U_M$, V-phase voltage $V_M$, and W-phase voltage $W_M$ to U-phase winding 31U, V-phase winding 31V, and W-phase winding 31W, respectively, of brushless DC motor 30. The total number of pulses of the inverter drive signals corresponds to the energization time period that has been set. U-phase current detection circuit 43U and V-phase current detection circuit 43V that are provided in drive circuit 40 detect U-phase current Iu and V-phase current Iv, respectively. The signals showing the detected U-phase current Iu and V-phase current Iv are input into coordinate transformation unit 55.

(4. Coordinate Transformation Unit 55)

Coordinate transformation unit 55 calculates W-phase current Iw based on U-phase current Iu and V-phase current Iv. Then, coordinate transformation unit 55 performs coordinate transformation of U-phase current Iu, V-phase current Iv, and W-phase current Iw, to thereby generate γ-axis current Iγ and δ-axis current Iδ. This coordinate transformation is performed using Clarke transformation in the above-mentioned equation (1) and Park transformation in the above-mentioned equation (2).

It should be noted that γ-axis current Iγ is a current component having the same electrical angle as energization angle $\theta_M$ (also referred to as a first current component). Also, γ-axis current Iγ is a current component having an electrical angle advancing by 90° from the first current component (also referred to as a second current component).

Figure 7:
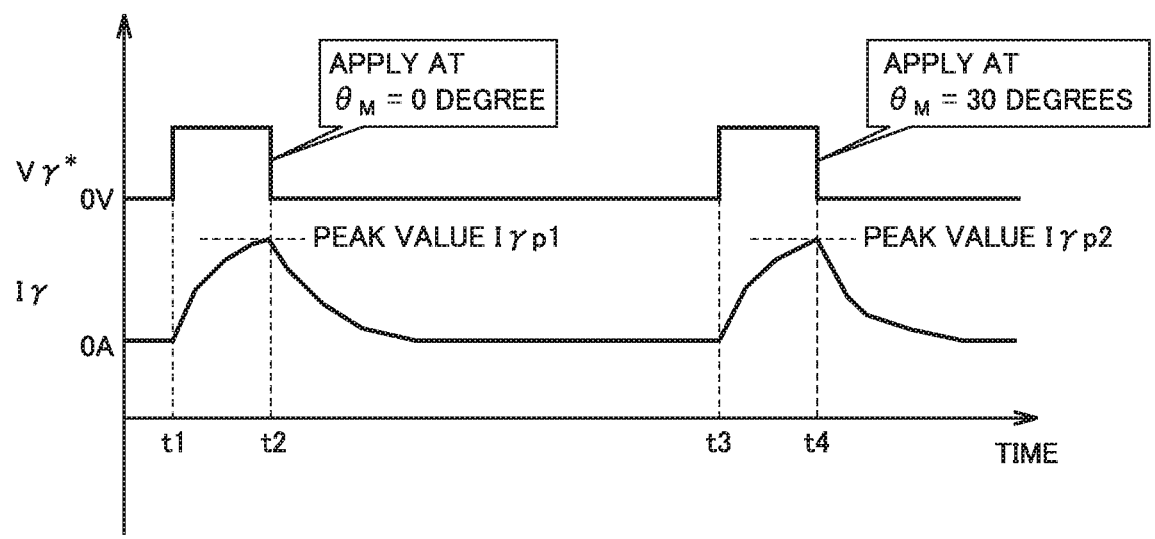
FIG. 7 is a timing chart schematically illustrating an example of the relation between a γ-axis voltage command value and the detected γ-axis current.

FIG. 7 is a timing chart schematically illustrating an example of the relation between γ-axis voltage command value Vγ* and the detected γ-axis current Iγ.

Referring to FIG. 7, in a time period from a time point t1 to a time point t2, initial position estimation unit 57 in FIG. 5 first sets energization angle $\theta_M$ at zero degree and also sets γ-axis voltage command value Vγ* at a prescribed set value. Thereby, pulse-width-modulated U-phase voltage $U_M$, V-phase voltage $V_M$ and W-phase voltage $W_M$ are applied to U-phase winding 31U, V-phase winding 31V, and W-phase winding 31W, respectively, of the stator. As a result, in a time period from time point t1 to time point t2, γ-axis current Iγ gradually increases from 0A and reaches a peak value Iγp1 at time point t2. At and after time point t2, voltage application to stator winding 31 is stopped, so that γ-axis currently gradually decreases. During a time period until a time point t3 at which a voltage is applied to stator winding 31 next time, the values of U-phase current Iu, V-phase current Iv, and W-phase current Iw return to zero, with the result that the value of γ-axis current Iγ also returns to zero.

Then, in a time period from time point t3 to a time point t4, initial position estimation unit 57 sets energization angle $\theta_M$ at 30 degrees and also sets γ-axis voltage command value Vγ* at the same set value as the previous value. As a result, γ-axis current Iγ gradually increases from 0A in a time period from time point t3 to time point t4, and reaches a peak value Iγp2 at time point t4. At and after time point t4, voltage application to stator winding 31 is stopped, so that γ-axis current Iγ gradually decreases.

Subsequently, in a similar manner, the set angle of energization angle $\theta_M$ is changed. Then, at the changed energization angle $\theta_M$, a pulse-width-modulated constant voltage is applied to stator winding 31. In this case, γ-axis voltage command value Vγ* is the same at each energization angle while the energization time period is also the same at each energization angle. Then, the peak value of γ-axis current Iγ at the end of voltage application is detected.

(5. Estimation of Magnetic Pole Position of Rotor by Initial Position Estimation Unit)

Again referring to FIG. 5, initial position estimation unit 57 estimates the position of the magnetic pole of rotor 35 based on the peak value of γ-axis current Iγ obtained with respect to each of the plurality of energization angles $\theta_M$. Ideally, energization angle $\theta_M$ at which the peak value of γ-axis current Iγ attains a maximum value is approximately equivalent to a magnetic pole position θ of rotor 35. In practice, however, magnetic pole position θ of rotor 35 is often not equivalent to energization angle $\theta_M$ at which the peak value of γ-axis current Iγ attains a maximum value.

Figure 8A:
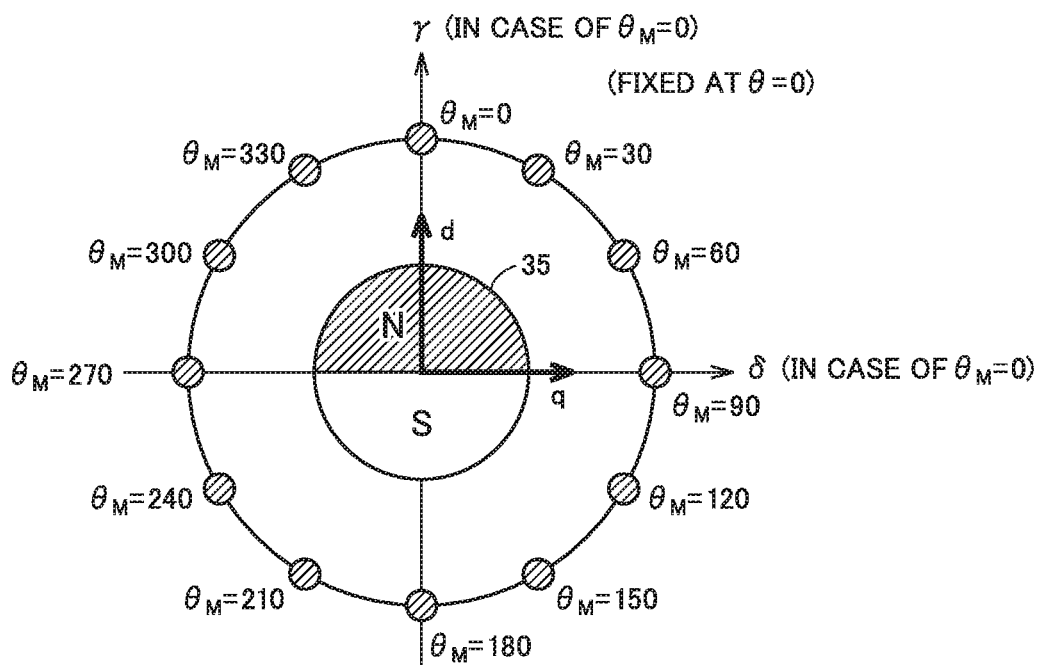
FIGS. 8A and 8B each are a diagram illustrating the relation between: a peak value of the γ-axis current; and the relative positional relation between the magnetic pole position of the rotor and an energization angle.
Figure 8B:
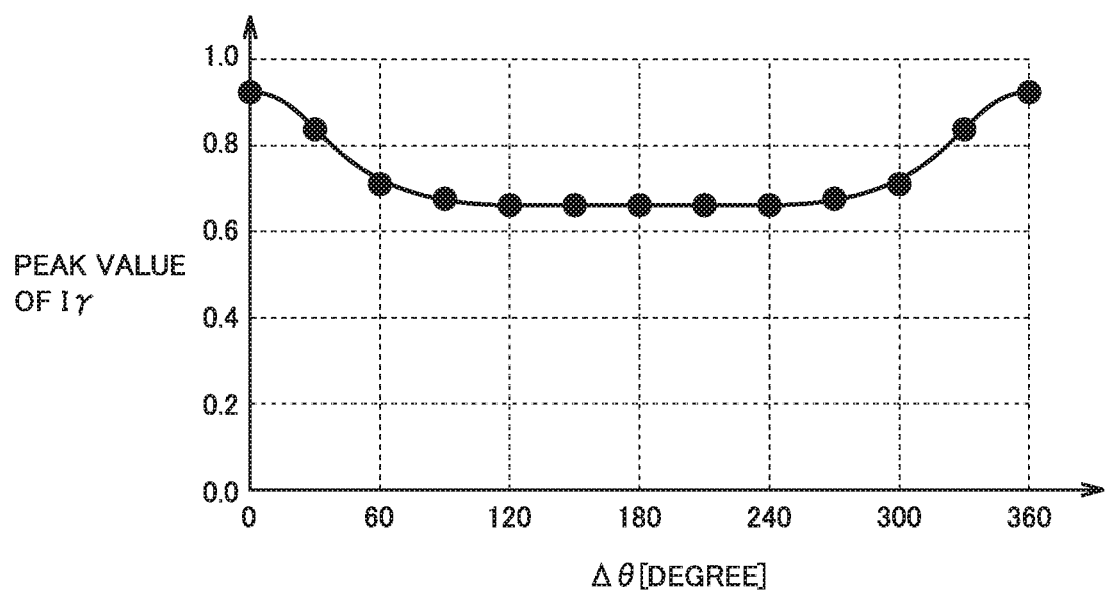

FIGS. 8A and 8B each are a diagram illustrating the relation between: the peak value of the γ-axis current; and the relative positional relation between the magnetic pole position of the rotor and the energization angle. First, referring to FIG. 8A, the relative positional relation between magnetic pole position θ of rotor 35 and energization angle $\theta_M$ will be described below.

In the case of FIG. 8A, magnetic pole position θ of rotor 35 is fixed at 0°. Accordingly, the d-axis is set in the direction of an electrical angle 0° while the q-axis is set in the direction of an electrical angle 90°. On the other hand, energization angle $\theta_M$ changes from 0° to 360° by 30°. FIG. 8A shows a γ-axis and a δ-axis in the case where energization angle $\theta_M$ is 0°. In this case, Δθ=0°.

Then, referring to FIG. 8B, the relation between the peak value of γ-axis current Iγ and an angle difference Δθ between magnetic pole position θ and energization angle $\theta_M$ will be described. In FIG. 8B, the horizontal axis shows angle difference Δθ while the vertical axis shows a peak value of γ-axis current Iγ. The unit of the vertical axis is an arbitrary unit.

As shown in FIG. 8B, ideally, when angle difference Δθ between magnetic pole position θ and energization angle $\theta_M$ is 0°, that is, when magnetic pole position θ is equal to energization angle $\theta_M$ (in the case where θ=$\theta_M$=0° in FIG. 8A), the peak value of γ-axis current Iγ shows a maximum value.

[Other Methods of Estimating Initial Magnetic Pole Position]

The following is an explanation about a modification of a method of estimating an initial magnetic pole position described with reference to FIGS. 8A and 8B, that is, a method of detecting an energization angle at which a peak value of the γ-axis current attains a maximum value.

(1. Functional Block Diagram)

Figure 9:
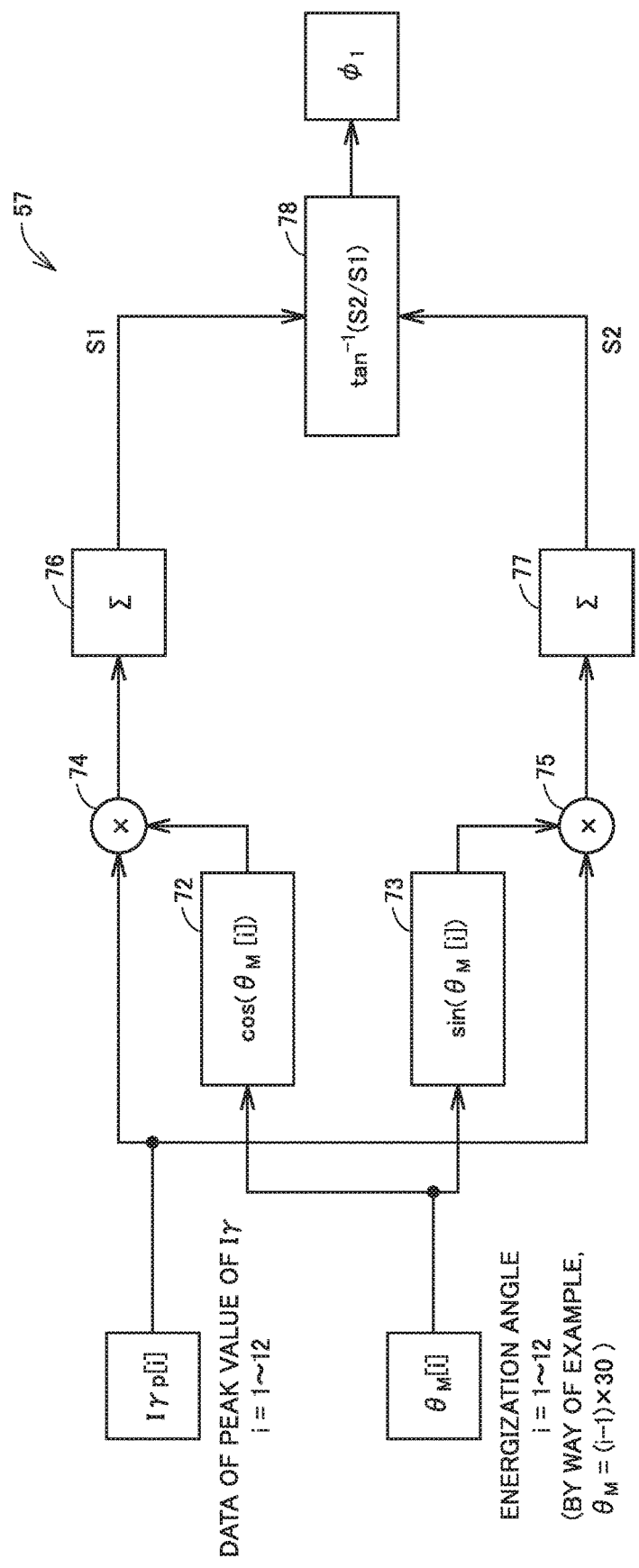
FIG. 9 is a functional block diagram showing a modification of an operation of an initial position estimation unit in FIG. 5.

FIG. 9 is a functional block diagram showing a modification of the operation of initial position estimation unit 57 in FIG. 5. Referring to FIG. 9, initial position estimation unit 57 includes a cosine computing unit 72, a sine computing unit 73, multipliers 74 and 75, integrators 76 and 77, and an initial position computing unit 78.

Cosine computing unit 72 and sine computing unit 73 each receive set energization angle $\theta_M$. For example, an energization angle $\theta_M[i]$ is set at (i−1)×30° in accordance with number i (i is an integer equal to or greater than 1 and equal to or less than 12). In this case, energization angle $\theta_M$=0° on the condition that i=0, and energization angle $\theta_M$=330° on the condition that i=12. It should be noted that the maximum value of the above-mentioned "i" is not limited to 12. Also, energization angle $\theta_M[i]$ does not need to be changed to be arranged in an ascending order sequentially from 0 degree, but may be changed to be arranged in order of 0°, 180°, 30°, 210°, 60°, 240°, ... 150°, and 330°, for example.

Cosine computing unit 72 calculates a cosine function value cos ($\theta_M[i]$) of the received energization angle $\theta_M$. Sine computing unit 73 calculates a sine function value sin ($\theta_M[i]$) of the received energization angle $\theta_M$. In place of actually calculating a trigonometric function value, the calculation result of the trigonometric function value may be stored in the form of a table in advance in memory, from which the cosine function value and the sine function value corresponding to energization angle $\theta_M$ may be read.

At each energization angle $\theta_M[i]$, multiplier 74 multiplies a peak value $I\gamma p[i]$ of $\gamma$-axis current $I\gamma$ corresponding to energization angle $\theta_M[i]$ by cosine function value $\cos(\theta_M[i])$ corresponding to energization angle $\theta_M[i]$. This computation is performed each time number i is updated. Integrator 76 integrates the results of computation by multiplier 74 that are obtained at each energization angle $\theta_M[i]$. The integrated value (that is, a total sum) of the results of computation by multiplier 74 for all energization angles $\theta_M[i]$ is defined as an integrated value S1.

Similarly, at each energization angle $\theta_M[i]$, multiplier 75 multiplies peak value $I\gamma p[i]$ of $\gamma$-axis current $I\gamma$ corresponding to energization angle $\theta_M[i]$ by sine function value $\sin(\theta_M[i])$ corresponding to energization angle $\theta_M[i]$. This computation is performed each time number i is updated. Integrator 77 integrates the results of computation by multiplier 75 that are obtained at each energization angle $\theta_M[i]$. The integrated value (that is, a total sum) of the results of computation by multiplier 75 for all energization angles $\theta_M[i]$ is defined as an integrated value S2.

Based on integrated value S1 calculated by integrator 76 and integrated value S2 calculated by integrator 77, specifically based on the ratio between integrated values S1 and S2, initial position computing unit 78 calculates an estimate value $\phi_1$ of the initial position of the magnetic pole of the rotor. More specifically, estimate value $\phi_1$ of the initial position of the magnetic pole of the rotor can be calculated by the inverse tangent of the ratio between integrated value S1 and integrated value S2, that is, by $\tan^{-1}(S2/S1)$.

(2. Theory of Estimate Calculation)

The following is an explanation about the theory based on which the initial position of the magnetic pole of the rotor can be estimated through the above-mentioned procedure.

Peak values $I\gamma p$ of the $\gamma$-axis current that are obtained in accordance with energization angles $\theta_M$ are arranged sequentially in order of energization angles $\theta_M$ so as to plot a graph. The waveform of the obtained peak values $I\gamma p$ of the $\gamma$-axis current is assumed to be approximated by a trigonometric function curve. Specifically, as shown in the following equation (6), it is assumed that peak value $I\gamma p$ of the $\gamma$-axis current as a function of $\theta_M$ is expanded in a series of a plurality of cosine functions having different cycles.

$$I\gamma p(\theta_M) = A_0 + A_1 \cos(\theta_M - \phi_1) + A_2 \cos(2\theta_M - \phi_2) + A_3 \cos(3\theta_M - \phi_3) + \ldots \quad (6)$$

In the above-mentioned equation (6), $A_0, A_1, A_2, \ldots$ each show a coefficient, and $\phi_1, \phi_2, \phi_3, \ldots$ each show a phase. The first term on the right side of the above-mentioned equation (6) shows a constant component irrespective of $\theta_M$; the second term on the right side shows the first-order component having a cycle of 360°; and the third term on the right side shows the second-order component having a cycle of 180°. The fourth and subsequent terms show higher order components.

Then, the above-mentioned equation (6) is multiplied by $\cos(\theta_M)$, and $\theta_M$ is subjected to an integration computation in an integration section from $-\pi$ to $\pi$. By this computation, the first term on the right side of the above-mentioned equation (6) results in zero, and also, the third and subsequent terms on the right side of the equation (6) also results in zero. Thus, only the computation result in the second term on the right side remains, so that the following equation (7) is eventually obtained. Since the above-mentioned integration calculation corresponds to the above-mentioned calculation of integrated value S1, the integrated value is denoted as S1.

$$S_1 = \int_{-\pi}^{\pi} I\gamma p(\theta_M)\cos\theta_M d\theta_M \quad (7)$$

$$= \int_{-\pi}^{\pi} A_1 \cos(\theta_M - \phi_1)\cos\theta_M d\theta_M$$

$$= A_1 \cos\phi_1 \int_{-\pi}^{\pi} \cos\theta_M \cos\theta_M d\theta_M + A_1 \sin\phi_1 \int_{-\pi}^{\pi} \sin\theta_M \cos\theta_M d\theta_M$$

$$= A_1 \pi \cos\phi_1$$

Similarly, the above-mentioned equation (6) is multiplied by $\sin(\theta_M)$, and $\theta_M$ is subjected to integration computation in an integration section from $-\pi$ to $\pi$. By this computation, the first term on the right side of the above-mentioned equation (6) results in zero, and also, the third and subsequent terms on the right side of the equation (6) results in zero. Thus, only the computation result in the second term on the right side remains, so that the following equation (8) is eventually obtained. Since the above-mentioned integration calculation corresponds to the above-mentioned calculation of integrated value S2, the integrated value is denoted as S2.

$$S_2 = \int_{-\pi}^{\pi} I\gamma p(\theta_M)\sin\theta_M d\theta_M \quad (8)$$

$$= \int_{-\pi}^{\pi} A_1 \cos(\theta_M - \phi_1)\sin\theta_M d\theta_M$$

$$= A_1 \cos\phi_1 \int_{-\pi}^{\pi} \cos\theta_M \sin\theta_M d\theta_M + A_1 \sin\phi_1 \int_{-\pi}^{\pi} \sin\theta_M \sin\theta_M d\theta_M$$

$$= A_1 \pi \sin\phi_1$$

By calculating an inverse tangent using the ratio between integrated value S1 in the above-mentioned equation (7) and integrated value S2 in the above-mentioned equation (8), phase $\phi_1$ can be calculated as shown in the following equation (9).

$$\phi_1 = \tan^{-1}\left(\frac{S_2}{S_1}\right) \quad (9)$$

The above-mentioned calculation can be considered as approximating the change of peak value $I\gamma p$ of the $\gamma$-axis current with respect to energization angle $\theta_M$ by the trigonometric function having a cycle of 360° (that is, one cycle of the electrical angle). In other words, the change of peak value $I\gamma p$ of the $\gamma$-axis current with respect to energization angle $\theta_M$ is approximated by $A_0 + A_1 \cdot \cos(\theta_M - \phi_1)$. This approximation equation has a maximum value $A_0 + A_1$ on the condition that $\theta_M = \phi_1$. Accordingly, $\phi_1$ that is an electrical angle at which the approximation equation has a maximum value can be estimated as a magnetic pole position of the rotor.

The above description has been made with reference to an integration calculation assuming that energization angle $\theta_M$ continuously changes. When energization angle $\theta_M$ is discrete, integration calculation is changed to total sum calculation as shown in the following equation (10), but the calculation manner is basically the same. The following equation (10) represents the case where there are 12 energization angles $\theta_M$ at each 30°, which is equivalent to the calculation in the above-described case in FIG. 9. In general, assuming that the number of energization times in one cycle of the electrical angle is defined as L times, the coefficient of $2\pi/L$ is multiplied as shown in the following equation (10).

$$\begin{cases} S_1 = \dfrac{2\pi}{12} \sum_{i=1}^{12} I\gamma p[i]\cos(\theta[i]) \\ S_2 = \dfrac{2\pi}{12} \sum_{i=1}^{12} I\gamma p[i]\sin(\theta[i]) \end{cases} \quad (10)$$

(3. One Example of Result of Initial Position Estimation)

Figure 10:
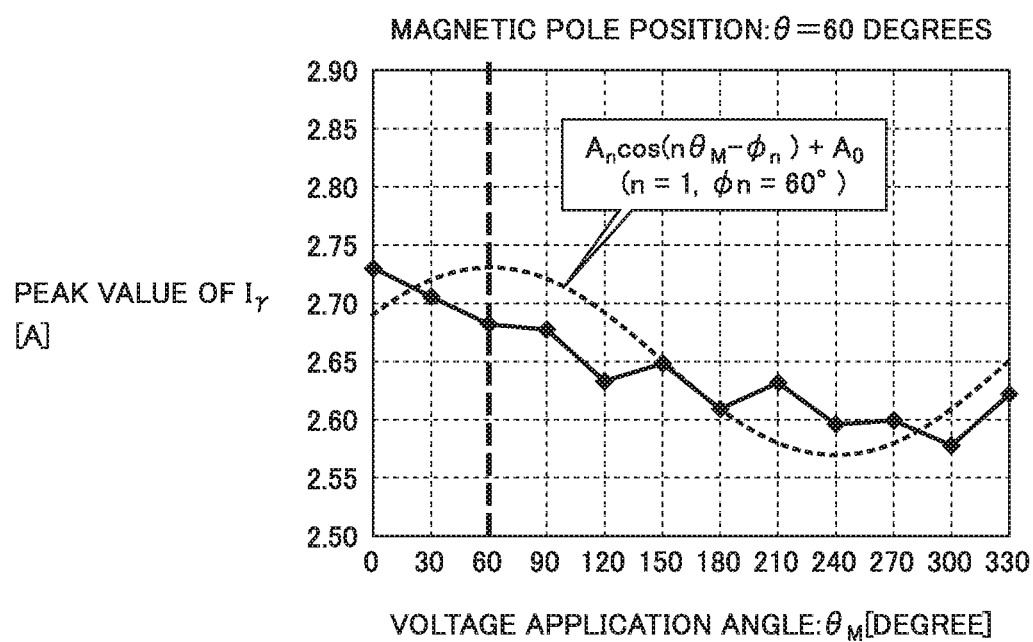
FIG. 10 is a diagram showing an example of a result of initial position estimation by an initial position estimation method shown in FIG. 9.

FIG. 10 is a diagram showing an example of a result of initial position estimation by the method of estimating an initial position shown in FIG. 9.

In FIG. 10, a broken line graph indicated by a solid line shows the result of measuring peak value I$\gamma$p of the $\gamma$-axis current at each energization angle $\theta_M$ in the case where magnetic pole position $\theta$ of the rotor is 60°. Essentially, the peak value of the $\gamma$-axis current is to attain a maximum value on the condition that energization angle $\theta_M$=60°, but the measurement result shows that the peak value of the $\gamma$-axis current attains a maximum value on the condition that energization angle $\theta_M$=0°.

This result of measuring peak value I$\gamma$p of the $\gamma$-axis current is assumed to be approximated by an approximation equation of $A_0+A_n \cdot \cos(n \cdot \theta_M - \phi_n)$ using a trigonometric function. It should be noted that n=1, that is, the cycle corresponds to one cycle of the electrical angle. In this case, as indicated by a broken line in FIG. 10, the above-mentioned result can be approximated by the approximate curve having a maximum value on the condition that $\phi_1$=60°. Also, when this maximum value is obtained, energization angle $\theta_M$ (that is, $\phi_1$=60°) is estimated as the initial position of the magnetic pole of the rotor. Thus, it turns out that accurate estimation can be achieved. A specific method of calculating the above-mentioned electrical angle $\phi_1$ is as described with reference to the functional block diagram in FIG. 9.

[Cause of Error in Initial Position Estimation Method and Method of Correcting Error]

The following is an explanation about the problem mainly dealt in the present disclosure with regard to the method of estimating an initial magnetic pole position in an inductive sensing scheme.

One problem of the method of estimating an initial magnetic pole position in an inductive sensing scheme lies in that errors occur in the estimation result depending on the structure and the characteristics of the motor. As a result, the energization angle at which the peak value of $\gamma$-axis current I$\gamma$ obtained at each energization angle attains a maximum value may not correspond to the magnetic pole position of the rotor.

If the electrical properties and the magnetic properties each are not different among the U-phase, the V-phase, and the W-phase, and also if there is no influence of the permanent magnet of rotor 35, U-phase current Iu, V-phase current Iv, and W-phase current Iw should change in synchronization with voltage command values Vu*, Vv*, and Vw*, respectively. For example, assuming that voltage command values Vu*, Vv*, and Vw* are represented by the above-mentioned equation (5), U-phase current Iu, V-phase current Iv, and W-phase current Iw are represented by the following equation (11). The following equation (11) represents a current amplitude denoted by $I_0$.

$$\begin{cases} Iu = I_0 \cos\theta_M \\ Iv = I_0 \cos(\theta_M - 120°) \\ Iw = I_0 \cos(\theta_M - 240°) \end{cases} \quad (11)$$

By applying the Clarke transformation in the above-mentioned equation (1) to U-phase current Iu, V-phase current Iv, and W-phase current Iw represented by the above-mentioned equation (11), $\alpha$-axis current I$\alpha$ and $\beta$-axis current I$\beta$ are obtained. Furthermore, by applying the Park transformation represented by the above-mentioned equation (2), $\gamma$-axis current I$\gamma$ and $\delta$-axis current I$\delta$ are obtained.

Figure 11:
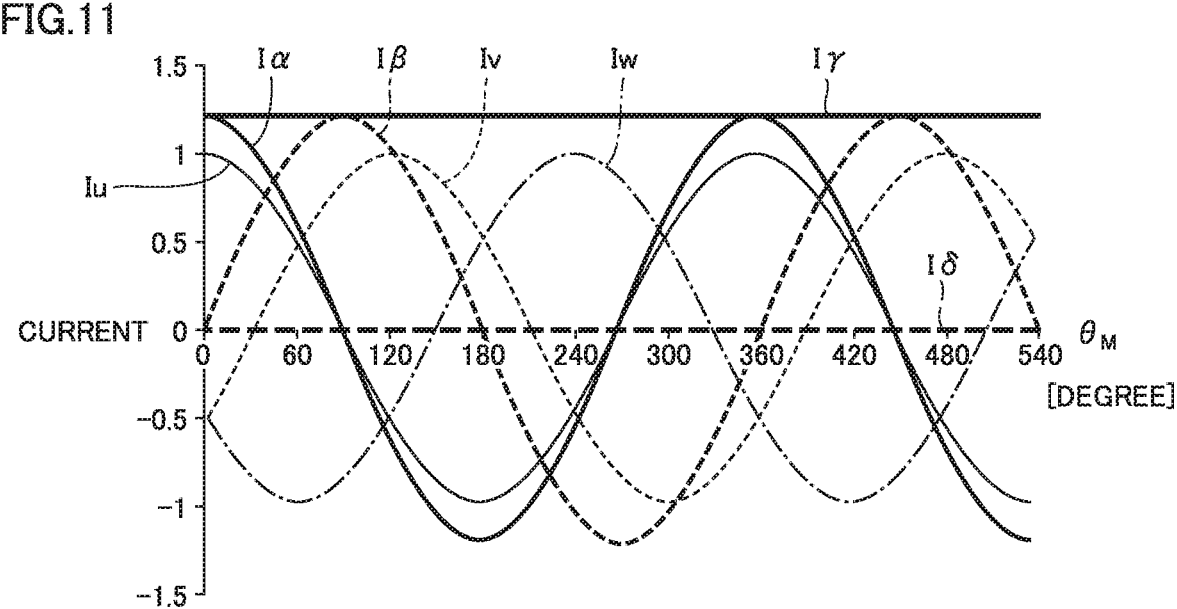
FIG. 11 is a diagram showing changes in an α-axis current, a β-axis current, a γ-axis current, and a δ-axis current corresponding to currents in respective phases with respect to an energization angle $\theta_M$.

FIG. 11 is a diagram showing changes in an $\alpha$-axis current, a $\beta$-axis current, a $\gamma$-axis current, and a $\delta$-axis current corresponding to currents in respective phases in the equation (11) with respect to energization angle $\theta_M$. A current amplitude $I_0$ in the equation (11) is normalized to 1. As shown in FIG. 11, when U-phase current Iu, V-phase current Iv, and W-phase current Iw synchronize with voltage command values Vu*, Vv*, and Vw*, respectively, $\gamma$-axis current I$\gamma$ attains a fixed value irrespective of energization angle $\theta_M$ and $\delta$-axis current I$\delta$ becomes zero irrespective of energization angle $\theta_M$.

However, $\delta$-axis current I$\delta$ actually does not become zero but may have a small value, which can be approximately considered as resulting from the following reason. Specifically, due to the differences in electrical properties and in magnetic properties among the phases, the stator winding is applied with an actual voltage at an electrical angle that is different from energization angle $\theta$ that has been set. For example, when a dead time is provided in order to prevent a flow-through current during application of voltages in respective phases, or when the ON time and the OFF time of each of transistors forming inverter circuit 41 are different among the phases, there occurs a difference between the set energization angle $\theta_M$ and the actual energization angle.

Figure 12:
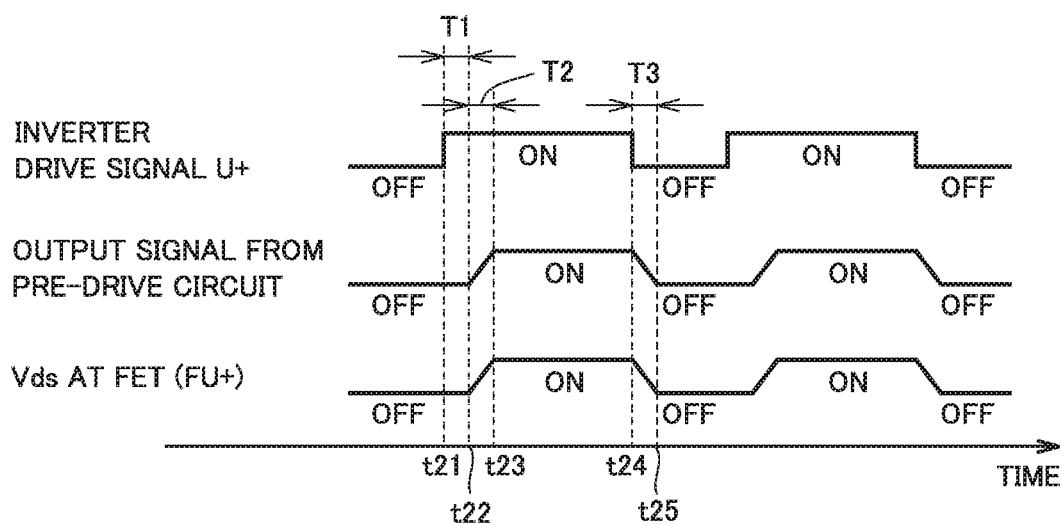
FIG. 12 is a schematic timing chart for illustrating a dead time, a turn-on delay time, and a turn-off delay time.

FIG. 12 is a schematic timing chart for illustrating a dead time, a turn-on delay time, and a turn-off delay time. FIG. 12 shows temporal changes in an inverter drive signal U+, a corresponding output signal from pre-drive circuit 44, and a drain-source voltage Vds of a field effect transistor (FET) FU+ in the FET (FU+) that forms a U-phase upper arm.

As shown in FIG. 12, at a time point t21, inverter drive signal U+ output from sensorless vector control circuit 50 is switched from an OFF state to an ON state. At a time point t22 delayed by a dead time T1 from time point t21 at which inverter drive signal U+ has changed, a gate drive signal output from pre-drive circuit 44 in FIG. 1 is switched from an OFF state to an ON state. Thereby, U-phase transistor FU+ starts to be turned on at time point t22. Then, U-phase transistor FU+ is completely turned on at a time point t23 delayed by a turn-on delay time T2 from time point t22.

Then, at a time point t24, inverter drive signal U+ output from sensorless vector control circuit 50 is switched from an ON state to an OFF state. In response to a change in inverter drive signal U+, at time point t24, a gate drive signal output from pre-drive circuit 44 is switched from an ON state to an OFF state. As a result, U-phase transistor FU+ starts to be turned off at time point t24. Then, U-phase transistor FU+ is completely turned off at a time point t25 delayed by a turn-off delay time T3 from time point t24.

When dead time T1, turn-on delay time T2, and turn-off delay time T3 each are different among the phases, there occurs a difference between the set energization angle $\theta_M$ and the actual energization angle.

It is assumed that the energization angle of the voltage actually applied to the stator winding is $\theta_M+\theta_e$ with respect to the set energization angle $\theta_M$. Hereinafter, $\theta_e$ will be referred to as an error angle. In this case, the values of α-axis current Iα and β-axis current Iβ that are obtained by applying the Clarke transformation to U-phase current Iu, V-phase current Iv, and W-phase current Iw are not dependent on the magnitude of error angle $\theta_e$. On the other hand, γ-axis current Iγ and δ-axis current Iδ that are obtained by applying the Park transformation to α-axis current Iα and β-axis current Iβ are influenced by error angle $\theta_e$. Specifically, when γ-axis current Iγ and δ-axis current Iδ are calculated according to the above-mentioned equation (2) using set energization angle $\theta_M$ even though the actual energization angle is $\theta_M+\theta_e$, δ-axis current Iδ does not become zero and an error occurs in γ-axis current Iγ.

The following is an explanation about an error corresponding to peak value Iγp of the γ-axis current in the case where error angle $\theta_e$ is taken into consideration (that is, in the case where actual energization angle is $\theta_M+\theta_e$) in estimation of the initial magnetic pole position in an inductive sensing scheme.

By applying the Clarke transformation to peak value Iup of the U-phase current, peak value Ivp of the V-phase current, and peak value Iwp of the W-phase current that are obtained at each energization angle, a peak value Iαp of the α-axis current and a peak value Iβp of the β-axis current are obtained. Furthermore, by applying the Park transformation to peak value Iαp of the α-axis current and peak value Iβp of the β-axis current using set energization angle $\theta_M$, the following equation (12A) is obtained. On the other hand, by applying the Park transformation to peak value Iαp of the α-axis current and peak value Iβp of the β-axis current using actual energization angle $\theta_M+\theta_e$, the following equation (12B) is obtained.

$$\begin{pmatrix} I\gamma p \\ I\delta p \end{pmatrix} = \begin{pmatrix} \cos\theta_M & \sin\theta_M \\ -\sin\theta_M & \cos\theta_M \end{pmatrix} \begin{pmatrix} I\alpha p \\ I\beta p \end{pmatrix} \quad (12A)$$

$$\begin{pmatrix} I\gamma p\_c \\ I\delta p\_c \end{pmatrix} = \begin{pmatrix} \cos(\theta_M+\theta_e) & \sin(\theta_M+\theta_e) \\ -\sin(\theta_M+\theta_e) & \cos(\theta_M+\theta_e) \end{pmatrix} \begin{pmatrix} I\alpha p \\ I\beta p \end{pmatrix} \quad (12B)$$

When error angle $\theta_e$ is not zero, peak value Iγp of the γ-axis current calculated by the above-mentioned equation (12A) includes an error, and the peak value of the corresponding δ-axis current Iδp does not become zero. On the other hand, a peak value Iγp_c of the γ-axis current calculated by the above-mentioned equation (12B) is a peak value of a true γ-axis current, and a peak value Iδp_c of the corresponding δ-axis current becomes zero.

When the matrix on the right side of the above-mentioned equation (12B) is re-written into a product of a matrix for the set energization angle $\theta_M$ and a matrix for error angle $\theta_e$, the following equation (13A) is obtained. Furthermore, when the following equation (13A) is combined with the above-mentioned equation (12A), the following equation (13B) is obtained.

$$\begin{pmatrix} I\gamma p\_c \\ I\delta p\_c \end{pmatrix} = \begin{pmatrix} \cos\theta_e & \sin\theta_e \\ -\sin\theta_e & \cos\theta_e \end{pmatrix} \begin{pmatrix} \cos\theta_M & \sin\theta_M \\ -\sin\theta_M & \cos\theta_M \end{pmatrix} \begin{pmatrix} I\alpha p \\ I\beta p \end{pmatrix} \quad (13A)$$

$$\begin{pmatrix} I\gamma p\_c \\ I\delta p\_c \end{pmatrix} = \begin{pmatrix} \cos\theta_e & \sin\theta_e \\ -\sin\theta_e & \cos\theta_e \end{pmatrix} \begin{pmatrix} I\gamma p \\ I\delta p \end{pmatrix} \quad (13B)$$

When the inverse matrix of the coefficient matrix in the above-mentioned equation (13B) is multiplied by both sides in the above-mentioned equation (13B), the following equation (14) is obtained. In the following equation (14), 0 is substituted into Iδp_c. Furthermore, when the matrix operation of the following equation (14) is performed, the following equation (15) is obtained.

$$\begin{pmatrix} I\gamma p \\ I\delta p \end{pmatrix} = \begin{pmatrix} \cos\theta_e & -\sin\theta_e \\ \sin\theta_e & \cos\theta_e \end{pmatrix} \begin{pmatrix} I\gamma p\_c \\ I\delta p\_c \end{pmatrix} = \begin{pmatrix} \cos\theta_e & -\sin\theta_e \\ \sin\theta_e & \cos\theta_e \end{pmatrix} \begin{pmatrix} I\gamma p\_c \\ 0 \end{pmatrix} \quad (14)$$

$$\begin{cases} I\gamma p = I\gamma p\_c \cdot \cos\theta_e \\ I\delta p = I\gamma p\_c \cdot \sin\theta_e \end{cases} \quad (15)$$

When the square root of the sum of the square of Iγp and the square of Iδp is calculated from the above-mentioned equation (15), peak value Iγp_c of the γ-axis current in consideration of error angle $\theta_e$ is obtained as shown in the following equation (16). In other words, the following equation (16) represents a correction equation by which peak value Iγp of the γ-axis current is corrected by peak value Iδp of the δ-axis current. Thus, it turns out that the corrected peak value of the γ-axis current is given by Iγp_c.

$$I\gamma p\_c = \sqrt{I\gamma p^2 + I\delta p^2} \quad (16)$$

Furthermore, error angle $\theta_e$ can be obtained from the above-mentioned equation (15). Error angle $\theta_e$ is obtained by the inverse tangent function of the ratio of the peak value of the δ-axis current to peak value Iγp of the γ-axis current (that is, Iδp/Iγp) as shown in the following equation (17).

$$\theta_e = \tan^{-1}\left(\frac{I\delta p}{I\gamma p}\right) \quad (17)$$

Figure 13:
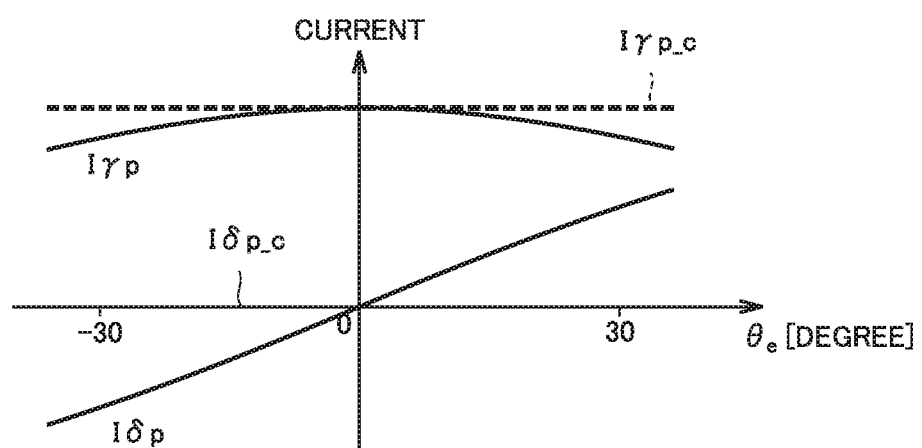
FIG. 13 is a graph showing the relation between: peak values of the γ-axis current and the δ-axis current that are calculated based on set energization angles; and a correction value of the peak value of the γ-axis current.

FIG. 13 is a graph showing the relation between: peak values of the γ-axis current and the δ-axis current that are calculated based on the set energization angle; and a correction value of the peak value of the γ-axis current.

In FIG. 13, the horizontal axis shows error angle $\theta_e$ while the vertical axis shows a current value. The corrected peak value Iγp_c of the γ-axis current is assumed to be a fixed value irrespective of error angle $\theta_e$. Based on this value as a reference, peak value Iγp of the γ-axis current and peak value Iδp of the corresponding δ-axis current are shown. The relation between error angle $\theta_e$ and each of these current peak values Iγp and Iδp is based on the above-mentioned equation (15).

As shown in FIG. 13, as the absolute value of error angle $\theta_e$ increases, peak value Iγp of the γ-axis current becomes smaller than its true value Iγp_c. Also, as the absolute value of error angle $\theta_e$ increases in the positive direction of error angle $\theta_e$, peak value Iδp of the δ-axis current also increases in the positive direction.

[Method of Estimating Initial Magnetic Pole Position of Rotor]

Based on the above description, the method of estimating the initial magnetic pole position of the rotor will be described. The following initial magnetic pole position estimation method is characterized in that peak value Iγp of the γ-axis current is corrected based on peak value Iδp of the δ-axis current.

Figure 14:
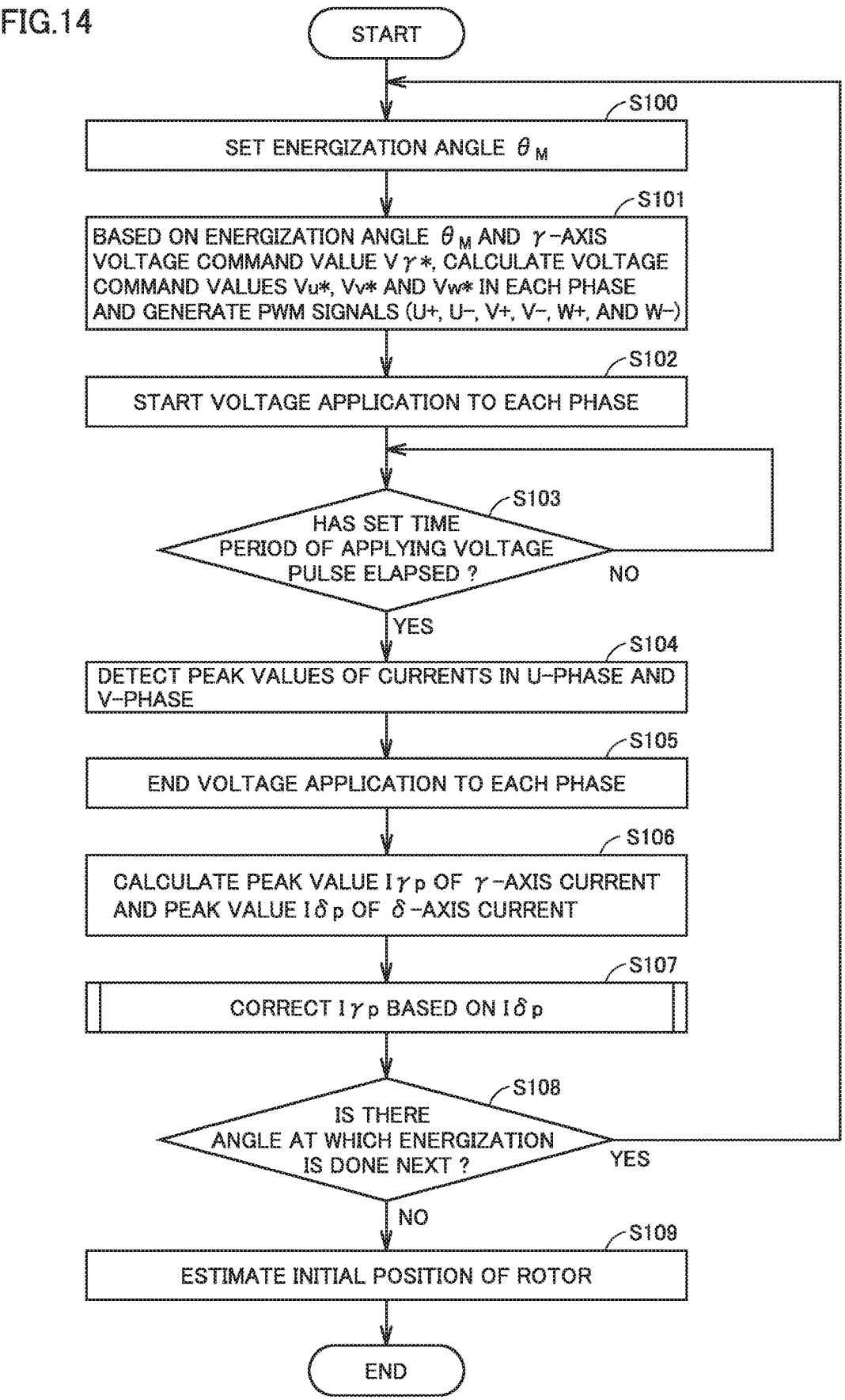
FIG. 14 is a flowchart illustrating a method of estimating an initial magnetic pole position in the first embodiment.

FIG. 14 is a flowchart illustrating a method of estimating an initial magnetic pole position in the first embodiment. The initial magnetic pole position estimation method shown in FIG. 14 is to detect a peak value of the γ-axis current within an energization time period in the state where the command values for the γ-axis voltage and the energization time period at each energization angle are set to be constant. Furthermore, the detected peak value of the γ-axis current is corrected by the peak value of the δ-axis current. Then, regarding the corrected peak value of the γ-axis current, the energization angle at which the peak value attains a maximum value (that is, the energization angle at which an effective inductance attains a minimum value) is determined as corresponding to the direction of the magnetic pole.

Referring to FIGS. 5 and 14, before starting the initial position estimation procedure, γ-axis voltage command value Vγ*, a plurality of energization angles $\theta_M$, and a time period during which a voltage is applied to stator winding 31 at each energization angle $\theta_M$ (that is, an energization time period) are set in advance.

In step S100, initial position estimation unit 57 in FIG. 5 sets energization angle $\theta_M$ at a predetermined value. In the next step S101, coordinate transformation unit 53 in FIG. 5 calculates U-phase voltage command value Vu*, V-phase voltage command value Vv*, and W-phase voltage command value Vw* based on the cosine value and the sine value at the set energization angle $\theta_M$ and also based on γ-axis voltage command value Vγ* that has been set in advance. Furthermore, PWM conversion unit 54 generates inverter drive signals U+, U−, V+, V−, W+, and W−, each of which is a PWM signal.

In the next step S102, based on the above-mentioned inverter drive signals U+, U−, V+, V−, W+, and W−, inverter circuit 41 in drive circuit 40 starts application of the pulse-width-modulated U-phase voltage $U_M$, V-phase voltage $V_M$, and W-phase voltage $W_M$ to each phase of stator winding 31 of brushless DC motor 30.

When the set time period of applying a voltage pulse has elapsed (YES in step S103), then in the next step S104, U-phase current detection circuit 43U and V-phase current detection circuit 43V in FIG. 1 detect a U-phase peak current Iup and a V-phase peak current Ivp, respectively, within the energization time period. The value of U-phase current Iu and the value of V-phase current Iv at the end of the energization time period can be defined as U-phase peak current Iup and V-phase peak current Ivp, respectively. Then, drive circuit 40 ends application of the voltage to stator winding 31 of brushless DC motor 30 (step S105).

In the next step S106, coordinate transformation unit 55 calculates a W-phase peak current Iwp from U-phase peak current Iup and V-phase peak current Ivp according to Iwp=−Iup−Ivp. Based on energization angle $\theta_M$, coordinate transformation unit 55 calculates a peak current Iγp of the γ-axis and a peak current Iδp of the corresponding δ-axis from peak currents Iup, Ivp, and Iwp in respective phases by coordinate transformation.

In the next step S107, initial position estimation unit 57 corrects peak current Iγp of the γ-axis based on peak current Iδp of the δ-axis. Various specific correction methods are conceivable, which will be described later.

The above-mentioned steps S100 to S107 are repeated by the predetermined set number of the energization angles (that is, until it is determined as NO in step S108).

Then, in the next step S109, initial position estimation unit 57 determines, as an initial position θ of the magnetic pole of the rotor, energization angle $\theta_M$ at which corrected peak value Iγp of the γ-axis current calculated in the above-mentioned step S107 attains a maximum value. The initial magnetic pole position can also be estimated using the method described with reference to FIGS. 9 and 10.

As above, the procedure of estimating an initial magnetic pole position ends. The following is an explanation about various methods of correcting peak value Iγp of the γ-axis current in the above-mentioned step S107.

[First Method of Correcting Peak Value Iγp of γ-Axis Current]

Figure 15:
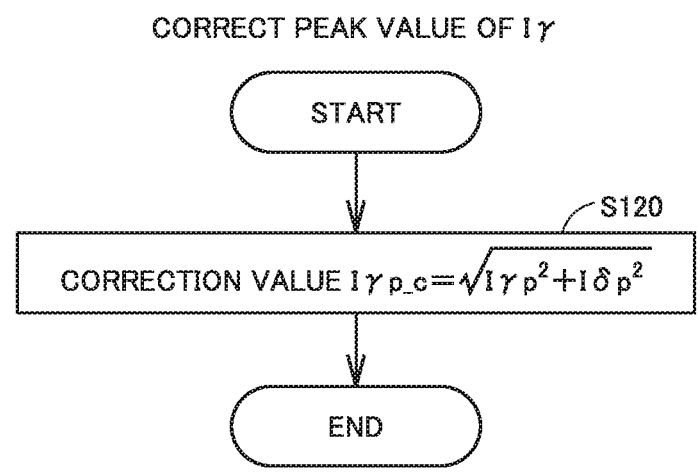
FIG. 15 is a flowchart illustrating the first method of correcting the peak value of the γ-axis current based on the peak value of the δ-axis current.

FIG. 15 is a flowchart illustrating the first method of correcting the peak value of the γ-axis current based on the peak value of the δ-axis current.

In step S120 in FIG. 15, initial position estimation unit 57 calculates a square root of the sum of: the square of peak value Iγp of the γ-axis current; and the square of peak value Iδp of the δ-axis current according to the above-mentioned equation (16). The obtained value of the square root is equivalent to a correction value Iγp_c of the peak value of the γ-axis current.

Figure 16A:
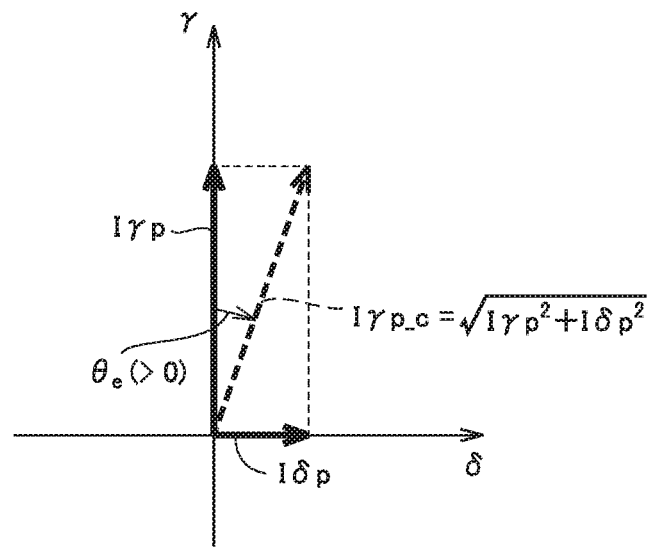
FIGS. 16A and 16B each show the correction value of the peak value of the γ-axis current shown in FIG. 15 as a vector in a γ-δ plane.
Figure 16B:
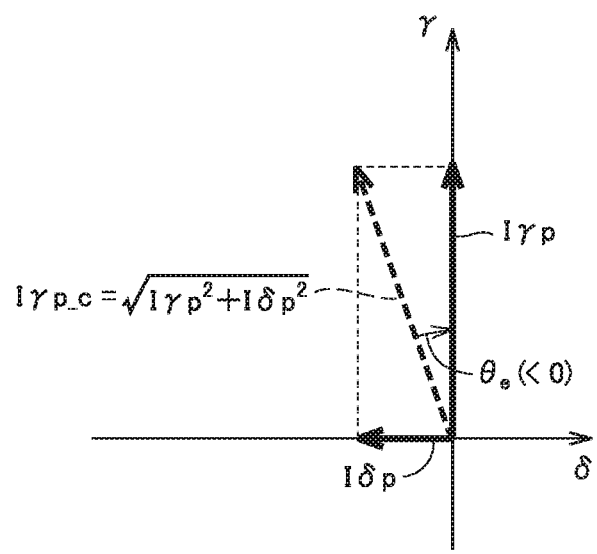

FIGS. 16A and 16B each show the correction value of the peak value of the γ-axis current shown in FIG. 15 as a vector in a γ-δ plane. FIG. 16A shows the case where peak value Iδp of the δ-axis current is positive while FIG. 16B shows the case where peak value Iδp of the δ-axis current is negative. In other words, FIG. 16A shows the case where error angle $\theta_e$ is positive while FIG. 16B shows the case where error angle $\theta_e$ is negative.

As shown in the figures, each of FIGS. 16A and 16B shows that the magnitude of correction value Iγp_c of the peak value of the γ-axis current is equivalent to the magnitude of the resultant vector of: the vector showing peak value Iγp of the γ-axis current; and the vector showing peak value Iδp of the δ-axis current in a γ-δ plane.

[Second Method of Correcting Peak Value Iγp of γ-Axis Current]

Figure 17:
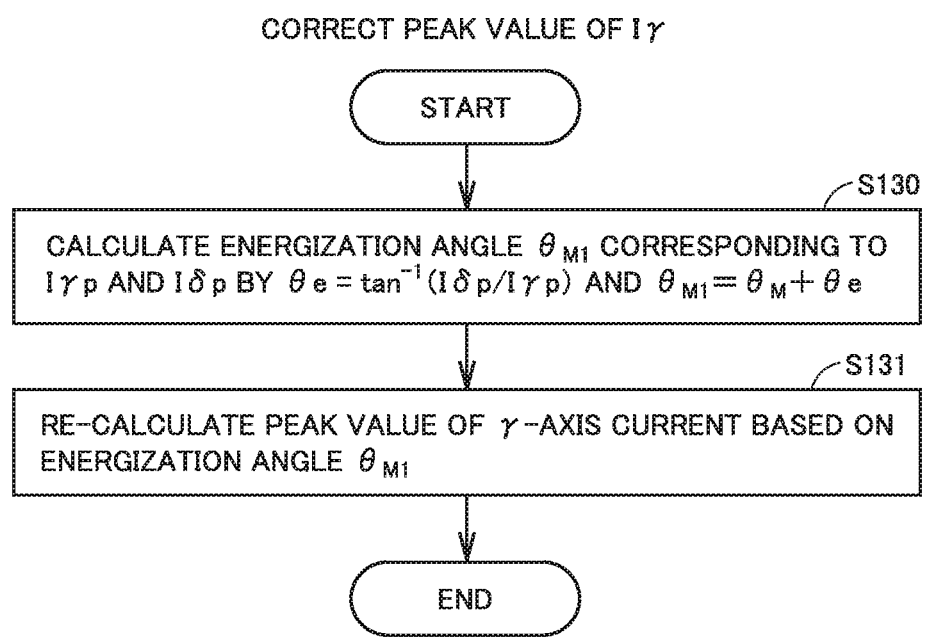
FIG. 17 is a flowchart illustrating the second method of correcting the peak value of the γ-axis current based on the peak value of the δ-axis current.

FIG. 17 is a flowchart illustrating the second method of correcting the peak value of the γ-axis current based on the peak value of the δ-axis current.

In step S130 in FIG. 17, according to the above-mentioned equation (17), initial position estimation unit 57 calculates the inverse tangent function of the ratio between peak value Iδp of the δ-axis current and peak value Iγp of the γ-axis current, thereby obtaining the value of error angle $\theta_e$.

Then, using the calculated error angle $\theta_e$, initial position estimation unit 57 calculates a correction value $\theta_{M1}$ of the energization angle according to the following equation.

$$\theta_{M1} = \theta_M + \theta_e \quad (18)$$

In the next step S131, initial position estimation unit 57 re-calculates the peak value of the γ-axis current using correction value $\theta_{M1}$ of the energization angle, thereby obtaining its correction value Iγp_c. The calculation equation is the same as that shown in the above-mentioned equation (12B).

[Third Method of Correcting Peak Value Iγp of γ-Axis Current]

Figure 18:
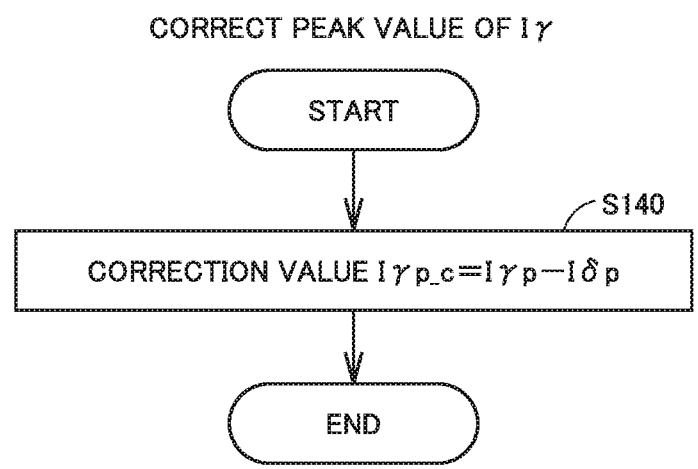
FIG. 18 is a flowchart illustrating the third method of correcting the peak value of the γ-axis current based on the peak value of the δ-axis current.

FIG. 18 is a flowchart illustrating the third method of correcting the peak value of the γ-axis current based on the peak value of the δ-axis current. FIG. 18 shows a method of correcting peak value Iγp of the γ-axis current by the calculation simpler than that in the correction method described with reference to FIGS. 15 and 17. It could be confirmed that such a simple calculation method allows improvement in accuracy of estimating the initial position of the magnetic pole.

In step S140 in FIG. 18, initial position estimation unit 57 subtracts peak value Iδp of the δ-axis current from peak value Iγp of the γ-axis current, thereby obtaining correction value Iγp_c of the peak value of the γ-axis current. In other words, correction value Iγp_c of the peak value of the γ-axis current can be calculated by the following equation.

$$I\gamma p\_c = I\gamma p - I\delta p \qquad (19)$$

Figure 19A:
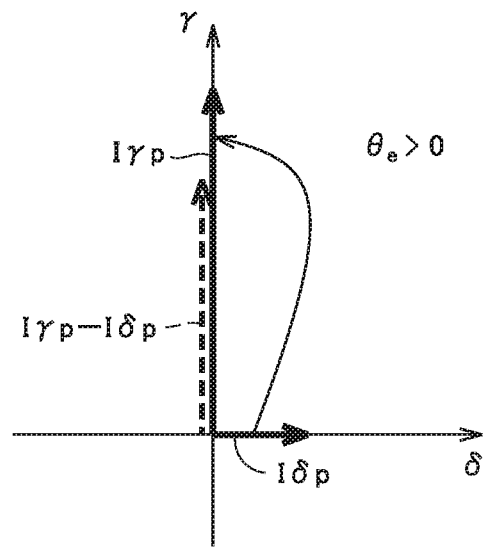
FIGS. 19A and 19B each show the correction value of the peak value of the γ-axis current shown in FIG. 18 as a vector in a γ-δ plane.
Figure 19B:
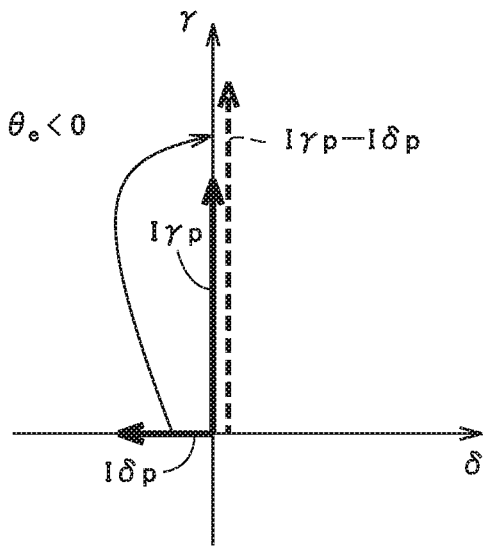

FIGS. 19A and 19B each show the correction value of the peak value of the γ-axis current shown in FIG. 18 as a vector in a γ-δ plane. FIG. 19A shows the case where peak value Iδp of the δ-axis current is positive while FIG. 19B shows the case where peak value Iδp of the δ-axis current is negative. In other words, FIG. 19A shows the case where error angle $\theta_e$ is positive while FIG. 19B shows the case where error angle $\theta_e$ is negative.

As shown in FIG. 19A, when peak value Iδp of the δ-axis current is positive, correction value Iγp_c of the peak value of the γ-axis current (that is, Iγp−Iδp) becomes smaller than the original peak value Iδp of the δ-axis current. As shown in FIG. 19B, when peak value Iδp of the δ-axis current is negative, correction value Iγp_c of the peak value of the γ-axis current (that is, Iγp−Iδp) becomes larger than the original peak value Iδp of the δ-axis current.

Figure 20A:
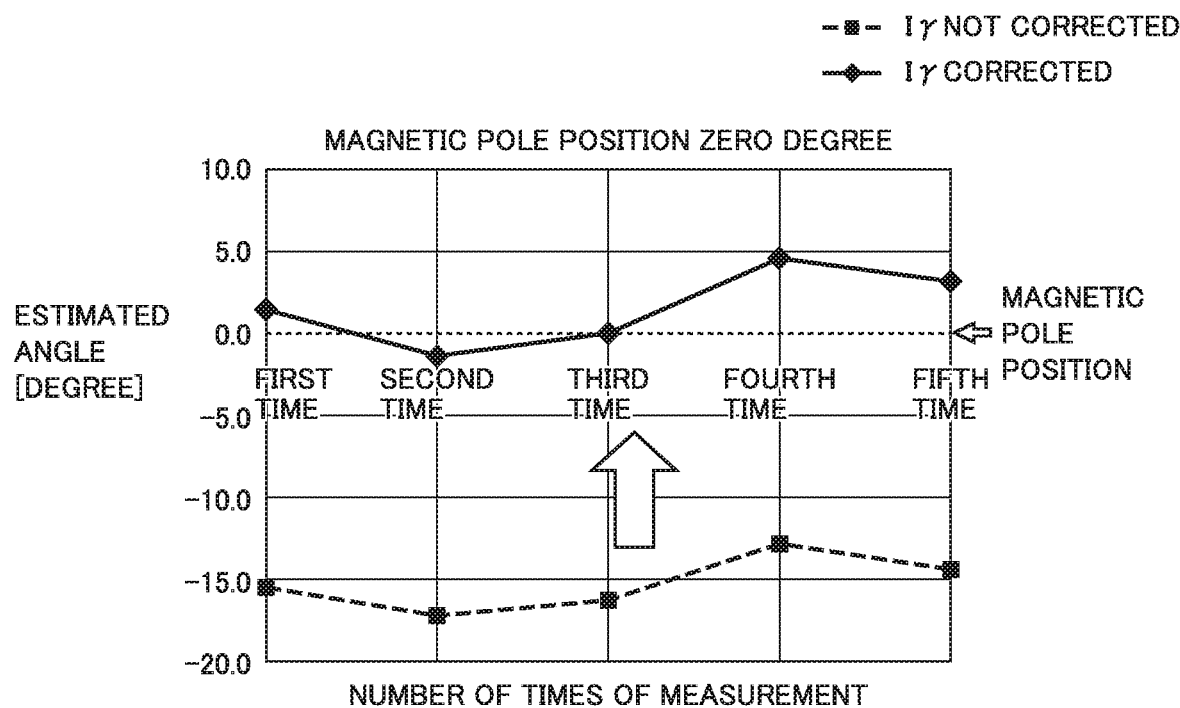
FIGS. 20A and 20B each are a diagram showing a result of estimating the initial magnetic pole position of the rotor by the method of correcting the peak value of the γ-axis current shown in FIG. 18.
Figure 20B:
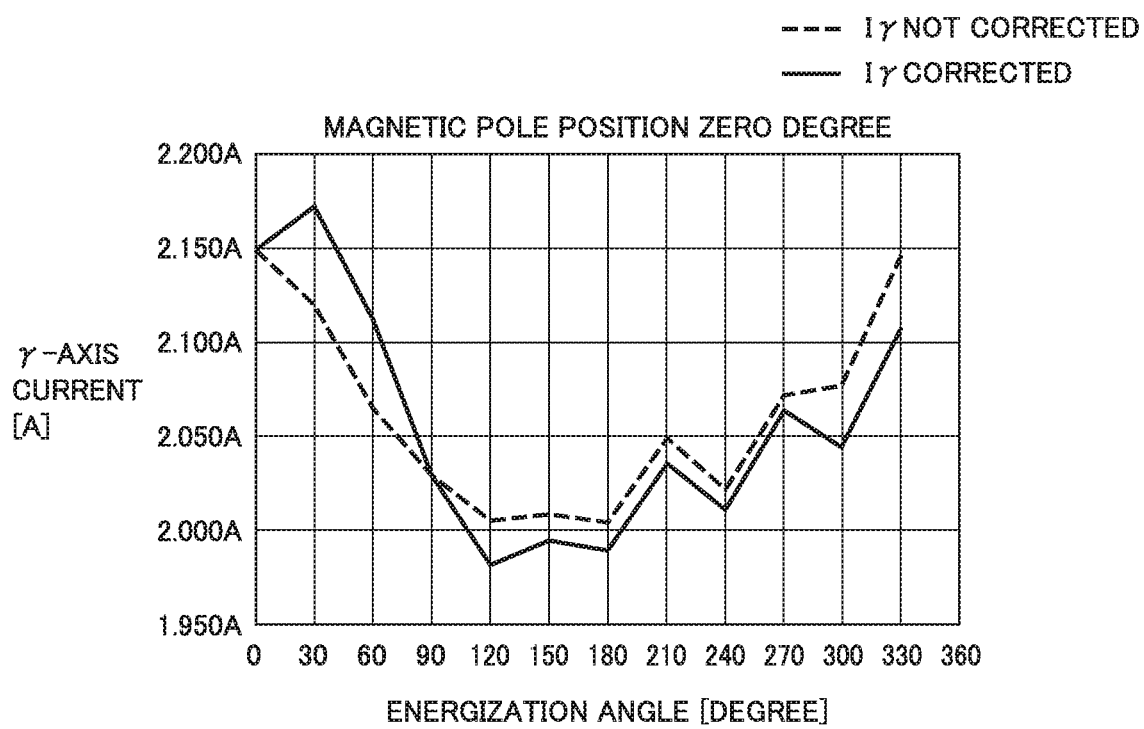

FIGS. 20A and 20B each are a diagram showing a result of estimating the initial magnetic pole position of the rotor by the method of correcting the peak value of the γ-axis current shown in FIG. 18. The initial magnetic pole position is estimated using the method described with reference to FIGS. 9 and 10. FIGS. 20A and 20B each also show the estimation results obtained on the condition that rotor's magnetic pole position θ=0°.

FIG. 20A is a diagram showing the estimated angle at the magnetic pole position each time when the initial magnetic pole position is estimated five times. The broken line graph indicated by a dashed line shows the result of estimating the initial magnetic pole position in the case where peak value Iγp of the γ-axis current is not corrected. The broken line graph indicated by a solid line shows the result of estimating the initial magnetic pole position in the case where peak value Iγp of the γ-axis current is corrected. As shown in FIG. 20A, in the case where peak value Iγp of the γ-axis current is corrected, the estimated angle of the initial magnetic pole position is closer to a true magnetic pole position (=0°) as compared with the case where peak value Iγp of the γ-axis current is not corrected. Thus, it turns out that the accuracy of estimating the magnetic pole position is improved.

FIG. 20B is a graph showing the relation between each energization angle and the detected peak value of the γ-axis current in the magnetic pole position estimation at the first time in FIG. 20A. The broken line graph indicated by a solid line shows the case where peak value Iγp of the γ-axis current is corrected. The broken line graph indicated by a broken line shows the case where peak value Iγp of the γ-axis current is not corrected.

It turns out that correction of the peak value of the γ-axis current increases the difference between a maximum value and a minimum value in the graph, so that the peak position more noticeably appears. In addition, since the initial magnetic pole position is estimated using the method described with reference to the above-mentioned FIGS. 9 and 10, the maximum value of the peak value of the γ-axis current does not necessarily correspond to the estimated magnetic pole position.

Effect in First Embodiment

According to the motor control device in the first embodiment as described above, the peak value of the γ-axis current and the peak value of the corresponding δ-axis current are detected at each energization angle when the initial position of the magnetic pole of the rotor is estimated in an inductive sensing scheme. Then, peak value Iγp of the γ-axis current is corrected using peak value Iδp of the δ-axis current, and the initial magnetic pole position of the rotor is estimated using the corrected peak value Iγp_c of the γ-axis current, so that the accuracy of estimating the initial magnetic pole position can be enhanced.

According to the above-mentioned method of estimating the initial position of the magnetic pole of the rotor, the initial position of the magnetic pole of the rotor can be accurately estimated even if the magnitude of the voltage to be applied and the length of the voltage application time period at each energization angle are limited so as to prevent the rotor from rotating. Furthermore, since the voltage application time period at each energization angle can be shortened, the time period required for estimating the initial position can be shortened.

[Modification]

Although the three-phase brushless DC motor has been described by way of example in the above, any AC motor that is driven with the voltages in two or more phases allows estimation of the initial position of the magnetic pole of the rotor in a similar procedure. Specifically, the peak values of the currents in a plurality of phases are subjected to variable transformation at each energization angle, and thereby divided into: the first current component (corresponding to the above-mentioned γ-axis current) having the same electrical angle as that of the energization angle; and the second current component (corresponding to the above-mentioned δ-axis current component) having an electrical angle advancing by 90° with respect to the energization angle. By correcting the first current component by the obtained second current component, the initial magnetic pole position of the rotor can be estimated in the same procedure as described above.

Also, according to the above description, one electrical cycle of the motor is divided equally by 30°. Then, using the peak value of the γ-axis current obtained at each of 12 energization angles, the initial position of the magnetic pole of the rotor is estimated. Theoretically, once the direction of the torque applied to the rotor is determined, the motor can be at least started up. Accordingly, the motor can be started if there is information about the peak value of the γ-axis current obtained at least two different energization angles of one electrical cycle of the motor.

Second Embodiment

The second embodiment will be described with regard to a method of correcting the energization angle during energization to the stator winding based on the result of calibration performed for obtaining error angle $\theta_e$ in advance.

[Procedure of Creating Calibration Data]

Figure 21:
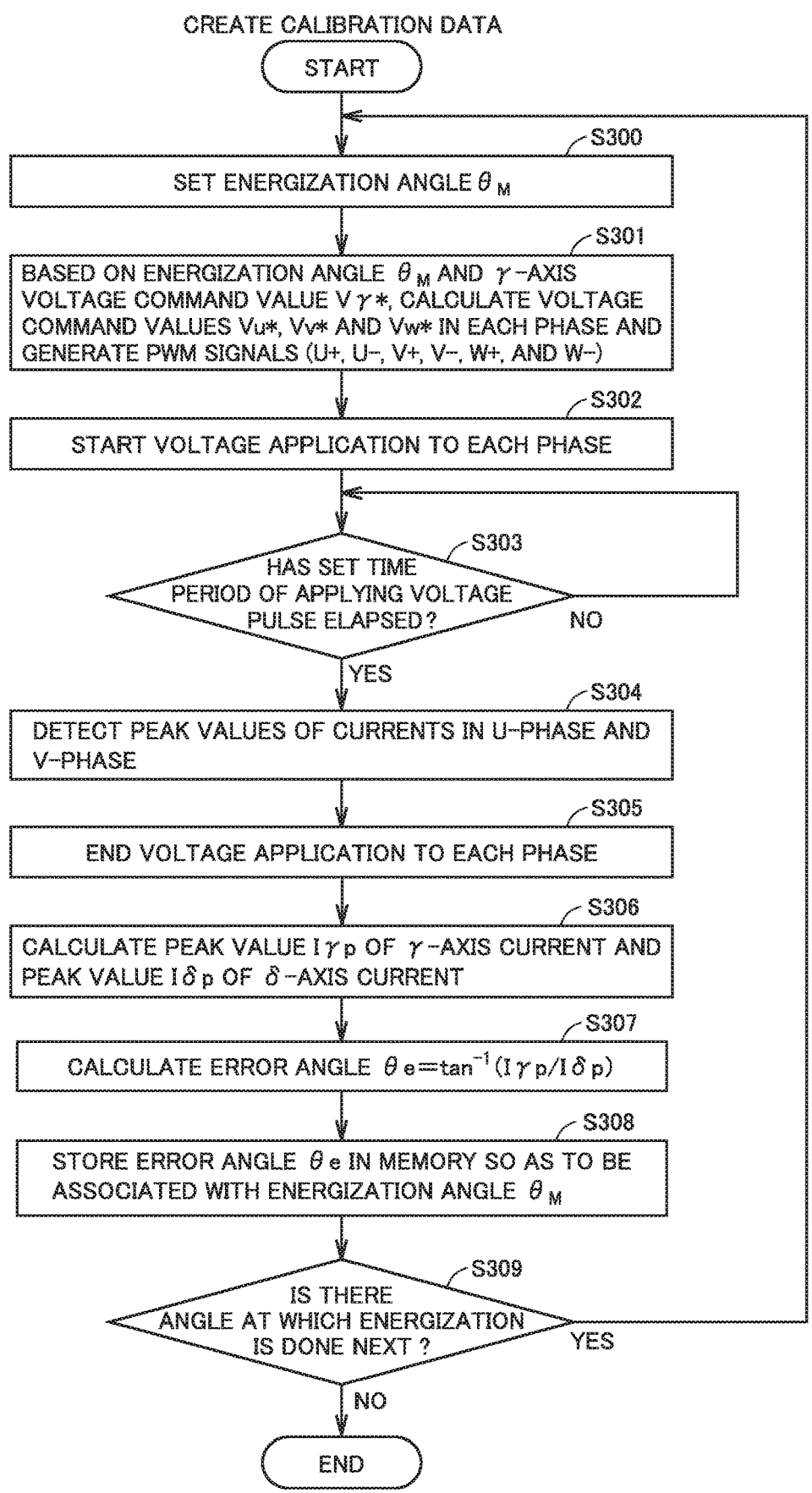
FIG. 21 is a flowchart illustrating a procedure of creating calibration data for correcting an energization angle.

FIG. 21 is a flowchart illustrating a procedure of creating calibration data for correcting the energization angle. When the procedure in FIG. 21 is performed, magnetic pole position θ of the rotor does not need to be set in advance. Alternatively, the procedure in FIG. 21 may be performed after magnetic pole position θ of the rotor is set at the predetermined electrical angle by a current drawing method (for example, at each of twelve electrical angles by 30°). In this case, the average value of error angles $\theta_e$ at respective set magnetic pole positions $\theta$ may be defined as final calibration data.

Referring to FIG. 21, since steps S300 to S306 are respectively equivalent to steps S100 to S106 in FIG. 14, the description thereof will not be repeated.

In step S307 in FIG. 21, initial position estimation unit 57 calculates error angle $\theta_e$ according to the above-mentioned equation (17) based on peak value $I\gamma p$ of the $\gamma$-axis current and peak value $I\delta p$ of the corresponding $\delta$-axis current that are detected with respect to the present energization angle $\theta_M$.

In the next step S308, initial position estimation unit 57 stores calculated error angle $\theta_e$ in a memory so as to be associated with the present energization angle $\theta_M$.

The above-mentioned steps S300 to S307 are repeated by the predetermined set number of energization angles (that is, until it is determined as NO in step S309). As above, error angle $\theta_e$ with respect to each energization angle $\theta_M$ is obtained as calibration data.

[Method of Estimating Initial Magnetic Pole Position of Rotor]

Figure 22:
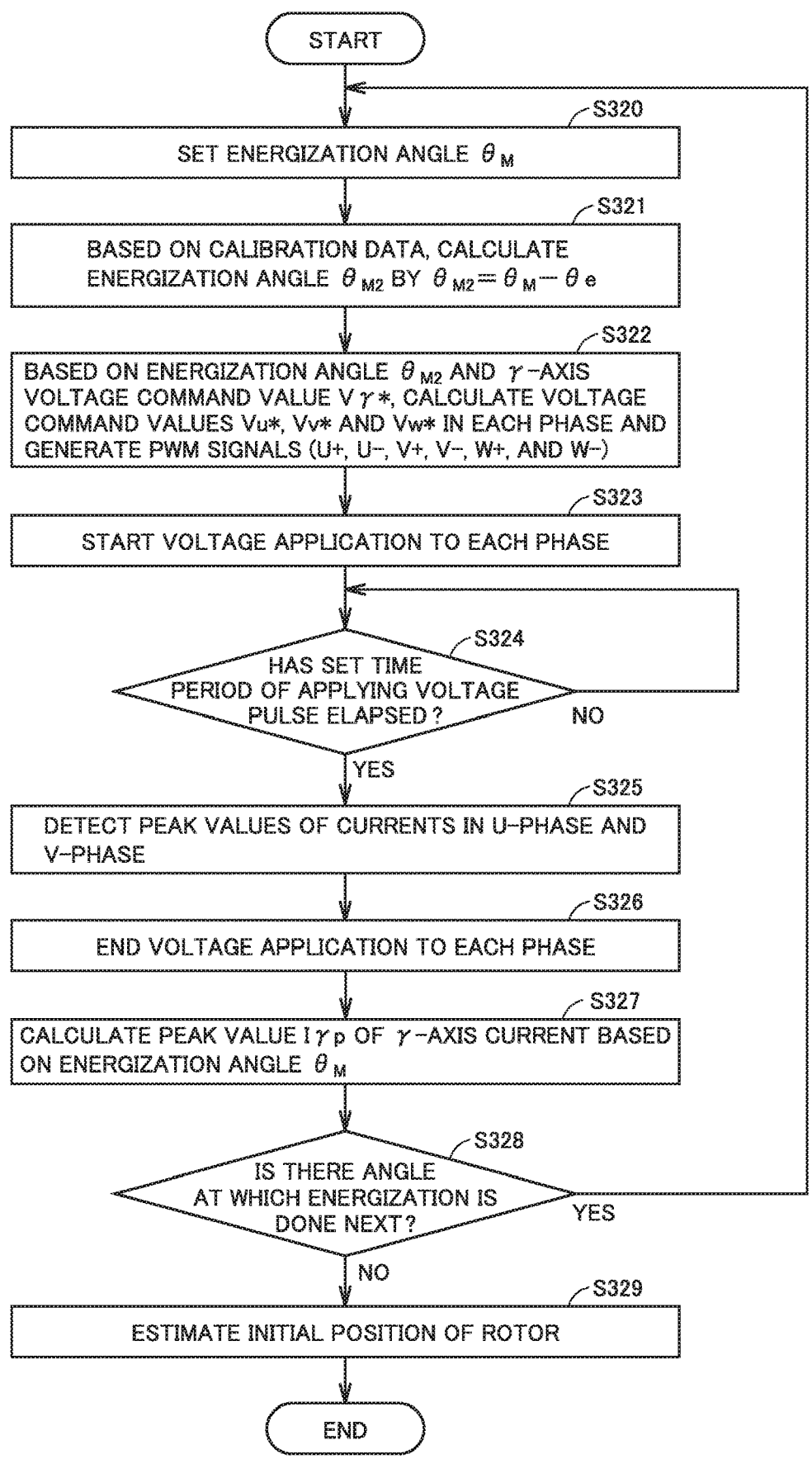
FIG. 22 is a flowchart illustrating a method of estimating an initial magnetic pole position in the second embodiment.

FIG. 22 is a flowchart illustrating a method of estimating an initial magnetic pole position in the second embodiment. According to the initial magnetic pole position estimation method shown in FIG. 22, the set energization angle is first corrected using the calibration data. Then, in the state where the command values for the energization time period and the $\gamma$-axis voltage are set to be constant at each of the corrected energization angles, the peak value of the $\gamma$-axis current within the energization time period is detected. The $\gamma$-axis current component is calculated not using the corrected energization angle but using the set energization angle before correction. Eventually, it is determined that the set energization angle at which the peak value attains a maximum value corresponds to the direction of the magnetic pole.

Referring to FIGS. 5 and 22, before starting the initial position estimation procedure, $\gamma$-axis voltage command value $V\gamma^*$, a plurality of set energization angles $\theta_M$, and a time period during which a voltage is applied to stator winding 31 at each of set energization angles $\theta_M$ (that is, an energization time period) are set in advance.

In step S320, initial position estimation unit 57 in FIG. 5 sets energization angle $\theta_M$ at a predetermined value.

In the next step S321, initial position estimation unit 57 uses the calibration data created in the procedure in FIG. 21 to correct set energization angle $\theta_M$, thereby calculating a corrected energization angle $\theta_{M2}$.

Specifically, corrected energization angle $\theta_{M2}$ is calculated using error angle $\theta_e$ corresponding to set energization angle $\theta_M$ by the following equation.

$$\theta_{M2} = \theta_M - \theta_e \quad (20)$$

When the calibration data does not include error angle $\theta_e$ corresponding to set energization angle $\theta_M$, error angle $\theta_e$ corresponding to set energization angle $\theta_M$ can be obtained by using interpolation or extrapolation.

In the next step S322, coordinate transformation unit 53 in FIG. 5 calculates U-phase voltage command value $Vu^*$, V-phase voltage command value $Vv^*$, and W-phase voltage command value $Vw^*$ based on the cosine value and the sine value at corrected energization angle $\theta_{M2}$ and based on $\gamma$-axis voltage command value $V\gamma^*$ that is set in advance. Furthermore, PWM conversion unit 54 generates inverter drive signals U+, U−, V+, V−, W+, and W−, each of which is a PWM signal.

In the next step S323, based on the above-mentioned inverter drive signals U+, U−, V+, V−, W+, and W−, inverter circuit 41 in drive circuit 40 starts application of the pulse-width-modulated U-phase voltage $U_M$, V-phase voltage $V_M$, and W-phase voltage $W_M$ to each phase of stator winding 31 of brushless DC motor 30.

When the set time period of applying a voltage pulse has elapsed (YES in step S324), then in the next step S325, U-phase current detection circuit 43U and V-phase current detection circuit 43V in FIG. 1 detect U-phase peak current Iup and V-phase peak current Ivp, respectively, within the energization time period. The value of U-phase current Iu and the value of V-phase current Iv at the end of the energization time period can be defined as U-phase peak current Iup and V-phase peak current Ivp, respectively. Then, drive circuit 40 ends application of the voltage to stator winding 31 of brushless DC motor 30 (step S326).

In the next step S327, coordinate transformation unit 55 calculates W-phase peak current Iwp based on U-phase peak current Iup and V-phase peak current Ivp according to Iwp=−Iup−Ivp. Furthermore, based on set energization angle $\theta_M$, coordinate transformation unit 55 calculates peak current $I\gamma p$ of the $\gamma$-axis from peak currents Iup, Ivp, and Iwp in respective phases by coordinate transformation.

The above-mentioned steps S320 to S327 are repeated by the predetermined set number of energization angles (that is, until it is determined as NO in step S328).

Then, in the next step S329, initial position estimation unit 57 determines, as an initial position $\theta$ of the magnetic pole of the rotor, energization angle $\theta_M$ at which corrected peak value $I\gamma p$ of the $\gamma$-axis current that is calculated in the above-mentioned step S327 attains a maximum value. As above, the procedure of estimating an initial magnetic pole position ends.

The method of estimating an initial magnetic pole position may be the method described with reference to FIGS. 9 and 10, or may be other methods, or may be for example a method of measuring the time period from when energization is started to when the $\gamma$-axis current reaches a current threshold value that is set in advance. The energization angle corresponding to the magnetic pole position of the rotor is observed in the case where the $\gamma$-axis current reaches a current threshold value in the shortest time period, that is, the case where the lowest inductance occurs.

Effect in Second Embodiment

According to a motor control device in the second embodiment, in the state where error angle $\theta_e$ is detected in advance at each set energization angle $\theta_M$, this error angle $\theta_e$ is used to correct set energization angle $\theta_M$, which is then corrected to obtain a corrected energization angle $\theta_{M2}$. This corrected energization angle $\theta_{M2}$ is used when a voltage is applied to the stator winding for estimating the initial magnetic pole position. In the subsequent procedure of estimating the initial magnetic pole position, set energization angle $\theta_M$ is used without any change. Thereby, the accuracy of estimating the initial magnetic pole position of the rotor can be enhanced as in the first embodiment.

In addition, the motor control device in the second embodiment can also be combined with the motor control device in the first embodiment. Thereby, the accuracy of estimating the initial magnetic pole position of the rotor can be further enhanced.

Third Embodiment

The third embodiment will be described with regard to an example in which the motor control device described in each of the first and second embodiments is used for controlling each of motors for driving a paper feed roller, a timing roller, a conveyance roller and the like in an image forming apparatus, which will be hereinafter described with reference to the accompanying drawings.

[Configuration Example of Image Forming Apparatus]

Figure 23:
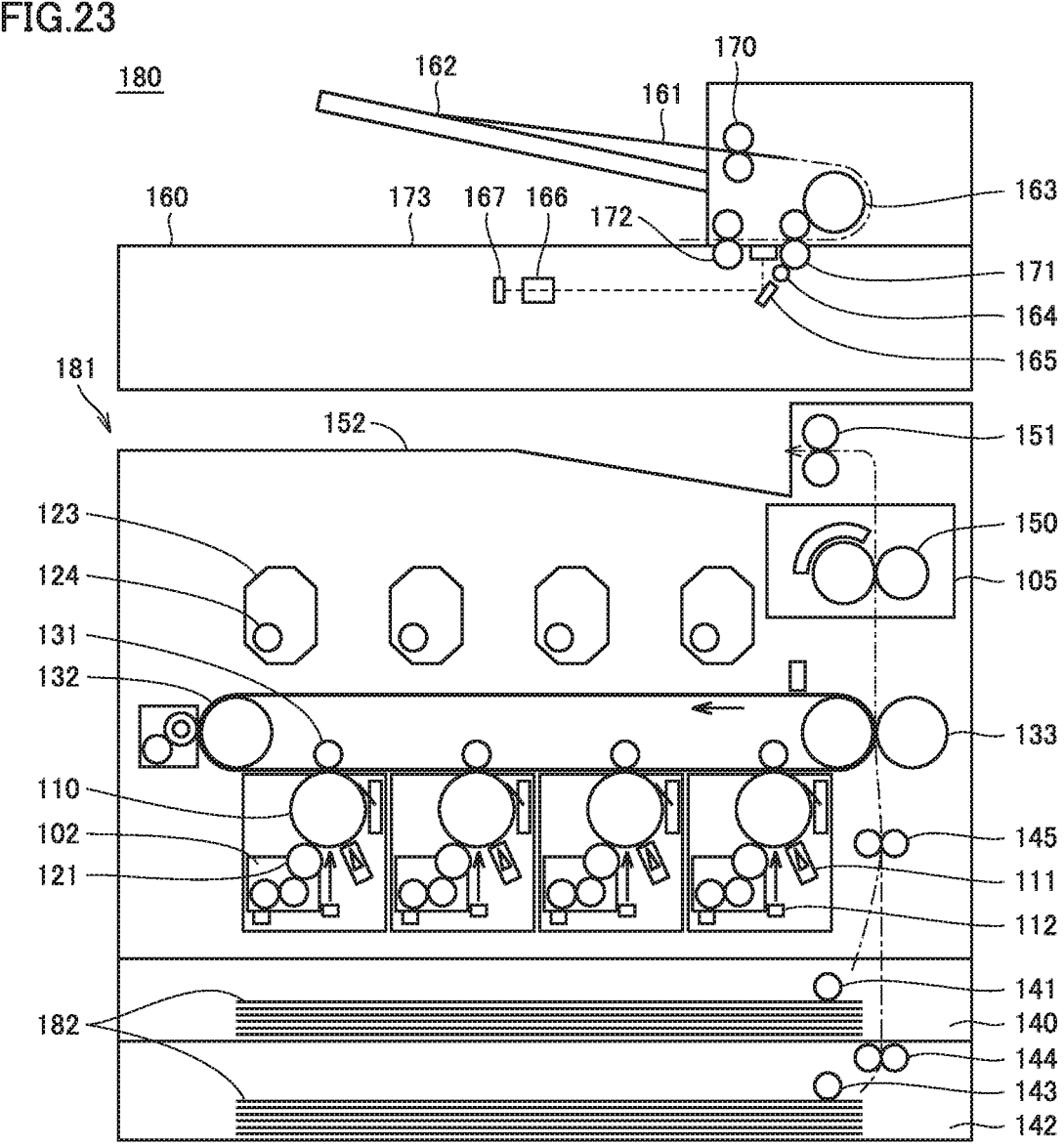
FIG. 23 is a cross-sectional view showing an example of the configuration of an image forming apparatus.

FIG. 23 is a cross-sectional view showing an example of the configuration of an image forming apparatus.

It should be noted that the cross-sectional view in FIG. 23 is merely schematically shown and may be partially enlarged or modified in aspect ratio in order to simplify the illustration.

Referring to FIG. 23, an image forming apparatus 180 includes an imaging unit 181 configured as a tandem color printer, a paper feed mechanism 182, and a document reading device 160. Image forming apparatus 180 may be configured as a multifunctional peripheral (MFP) connected to a network and having functions as a printer, a scanner, a copy machine, a facsimile machine, and the like.

Imaging unit 181 includes four photoreceptor cartridges 191, 192, 193, 194, a primary transfer roller 131, a transfer belt 132, a toner bottle 123, a secondary transfer roller 133, and a fixing device 105.

Photoreceptor cartridges 191, 192, 193, 194 form toner images of four colors including yellow (Y), magenta (M), cyan (C), and black (K), respectively. Each of photoreceptor cartridges 191, 192, 193, 194 includes a cylindrical photoreceptor 110, a charging unit 111, an image exposure device 112 including a light source, and a developing device 102 including a developing roller 121.

Charging unit 111 uniformly charges the surface of photoreceptor 110 at a prescribed potential. Image exposure device 112 causes the image corresponding to a document image to be exposed to the charged region of photoreceptor 110. Thereby, an electrostatic latent image is formed on photoreceptor 110. Using developing roller 121 to which developing bias is applied, developing device 102 causes toner to adhere to the electrostatic latent image, thereby forming a visible toner image.

Also, four toner bottles 123 are provided corresponding to their respective photoreceptor cartridges 191, 192, 193, and 194. Toner is supplied from toner bottles 123 to their respective photoreceptor cartridges. A stirring fin 124 for stirring toner is provided inside each of toner bottles 123.

Four primary transfer rollers 131 are provided so as to face their respective four photoreceptors 110. Each of photoreceptors 110 and a corresponding one of primary transfer rollers 131 are pressed against each other with transfer belt 132 interposed therebetween. Furthermore, a bias for attracting toner is applied to each primary transfer roller 131. Thereby, the visible toner image on the surface of photoreceptor 110 after development is transferred onto transfer belt 132.

The visible toner image transferred onto transfer belt 132 is conveyed to the position of secondary transfer roller 133. A transfer voltage is also applied to secondary transfer roller 133 in the same manner as with the primary transfer roller. Thereby, the visible toner image conveyed by transfer belt 132 is transferred onto a sheet of paper as a recording medium 183 at a nip portion between secondary transfer roller 133 and transfer belt 132.

The visible toner image transferred onto recording medium 183 is conveyed to fixing device 105. Fixing device 105 has a fixing roller 150 and uses this fixing roller 150 to heat and pressurize recording medium 183, thereby fixing the visible toner image on recording medium 183. Recording medium 183 after fixation is discharged by a paper discharge roller 151 onto a paper discharge tray 152.

Paper feed mechanism 182 takes in a sheet of paper as recording medium 183 from paper feed cassettes 140 and 142, and then conveys the sheet of paper to secondary transfer roller 133. Paper feed mechanism 182 includes paper feed cassettes 140, 142, paper feed rollers 141, 143, a conveyance roller 144, and a timing roller 145.

Recording media 183 housed in paper feed cassette 140 in the first stage are taken out one by one by paper feed roller 141 and conveyed to timing roller 145. Recording media 183 housed in paper feed cassette 142 in the second stage are taken out one by one by paper feed roller 143 and conveyed through conveyance roller 144 to timing roller 145.

Timing roller 145 temporarily stops the supplied recording medium 183, thereby adjusting: the timing at which the visible toner image transferred onto transfer belt 132 is conveyed to secondary transfer roller 133; and the timing at which recording medium 183 is supplied to secondary transfer roller 133.

Document reading device 160 reads the document image on a document sheet 161, to thereby generate image data. In the example shown in FIG. 23, document reading device 160 is provided above imaging unit 181. Document reading device 160 includes a document platen 162, a paper feed roller 170, document conveyance rollers 163, 171, a document discharge roller 172, a paper discharge tray 173, a light source 164, a mirror 165, a lens 166, and an image sensor 167 such as a charged-coupled device (CCD).

Document sheets 161 placed on document platen 162 are taken in one by one by paper feed roller 170. Document sheet 161 is conveyed by document conveyance rollers 163 and 171, and thereby, reaches a document reading position.

At the document reading position, light source 164 applies light upon the document image on document sheet 161. The light reflected on the surface of document sheet 161 is reflected by mirror 165, and thereafter, condensed by lens 166 so as to be incident upon image sensor 167. As a result, the document image on document sheet 161 is formed as an image on the sensor surface of image sensor 167, and the image data of the document image is produced by image sensor 167.

Document sheet 161 having passed through the document reading position is discharged by document discharge roller 172 onto paper discharge tray 173.

[Application of Brushless DC Motor to Driving Source of Roller]

In image forming apparatus 180 configured as described above, various types of rollers have been conventionally driven using stepping motors in many cases, but currently driven using brushless DC motors in many cases. This is because there are problems that a stepping motor is larger in noise, greater in power consumption and lower in efficiency than a brushless DC motor.

However, for closed loop control, a normal brushless DC motor is provided with a Hall element or an encoder for detecting the rotation position of the rotor. Extra costs required for providing such a sensor also cause a new problem that the normal brushless DC motor is higher in cost than the stepping motor that allows open loop control. It is strongly desired to use a sensorless-type brushless DC motor in order to solve the above-described problems.

In this case, the sensorless-type brushless DC motor requires estimation of the initial position of the magnetic pole of the rotor when the motor in the stopped state is started. As a method of estimating the initial position, generally, the stator is energized at a prescribed energization angle, and the magnetic pole of the rotor is attracted to the position corresponding to the energization angle, and thereafter, rotation of the motor is started.

However, in the case of image forming apparatus 180, the above-described method of pulling the rotor cannot be used particularly for the motors for driving paper feed rollers 141, 143 and 170 and timing roller 145, for the following reason. In the case of paper feed rollers 141, 143, and 170, a sheet of paper is held by a roller nip. In the case of timing roller 145, the tip of a sheet of paper comes into contact with the inlet of the roller nip. Thus, by pulling the rotor, the roller is rotated to thereby cause a sheet of paper as recording medium 183 to be also moved together, which may cause a paper jam in the case of paper feed rollers 141, 143 and 170, and also, which may lead to difficulty in achieving accurate timing control in the case of timing roller 145.

Particularly an inner rotor-type motor causes a problem in the above-described point (but the present disclosure is not limited to an inner rotor-type motor). Since the inner rotor-type motor has small inertia, which is advantageous in the case where the motor is repeatedly started and stopped at frequent intervals. However, when the inertia is small as in the inner rotor-type motor in the case where the initial position is estimated in an inductive sensing scheme, there occurs a problem that a rotor is moved readily by the current flowing through the stator winding during the initial position estimation.

For the reasons as described above, the initial position of the magnetic pole of the rotor is estimated by an inductive sensing scheme in which the stator winding is applied with a voltage enough to prevent the rotor from rotating, as already described above. In this initial position estimation, the motor control devices described in the first and second embodiments are applicable in order to estimate the initial position with accuracy and in a short time period.

[Details of Method of Controlling Roller]

Figure 24:
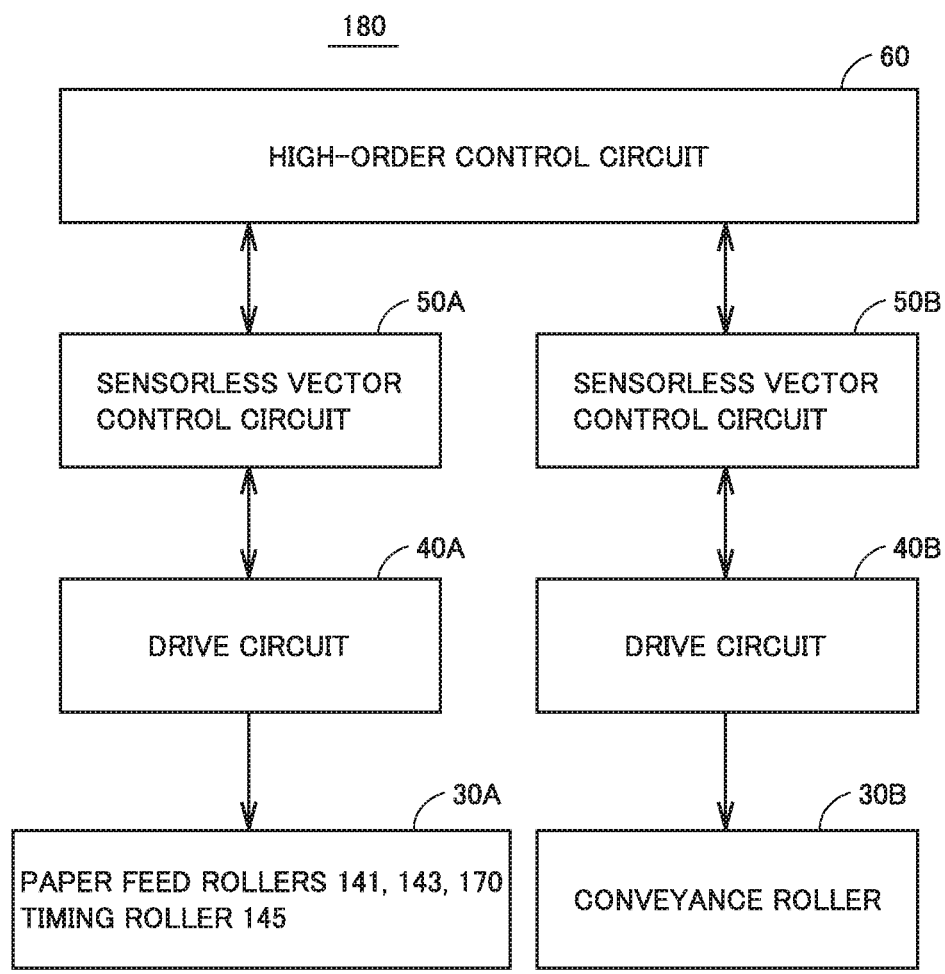
FIG. 24 is a block diagram showing the configuration of: a motor used for controlling driving of each of rollers; and its control device, in the image forming apparatus in FIG. 23.

FIG. 24 is a block diagram showing the configuration of: a motor used for controlling driving of each of rollers; and its control device, in the image forming apparatus in FIG. 23.

FIG. 24 shows image forming apparatus 180 representatively including: a brushless DC motor 30A for driving one of paper feed rollers 141, 143, 170, and timing roller 145; and a brushless DC motor 30B for driving a conveyance roller. Furthermore, drive circuits 40A and 40B are provided corresponding to brushless DC motors 30A and 30B, respectively. Also, sensorless vector control circuits 50A and 50B are provided corresponding to brushless DC motors 30A and 30B, respectively. Furthermore, image forming apparatus 180 includes a high-order control circuit 60 for controlling sensorless vector control circuits 50A and 50B.

In this case, sensorless vector control circuit 50A for controlling brushless DC motor 30A for driving one of paper feed rollers 141, 143, 170 and timing roller 145 includes at least one of the configurations described in the first and second embodiments. In other words, as described in the first embodiment, sensorless vector control circuit 50A includes the means for correcting peak value Iγp of the γ-axis current based on peak value Iδp of the δ-axis current. Alternatively, as described in the second embodiment, sensorless vector control circuit 50A includes the means for correcting energization angle $\theta_M$ used when applying a voltage to the stator winding based on the calibration data created in advance. Thereby, the initial position of the magnetic pole of the rotor can be accurately estimated.

Brushless DC motor 30B for driving the conveyance roller does not have to include each of the means for correcting peak value Iγp of the γ-axis current and the means for correcting energization angle $\theta_M$ used when applying a voltage to the stator winding, as described above. However, depending on the configurations of the roller and the motor, some of the conveyance rollers may include at least one of the above-mentioned correcting means in order to suppress errors.

Figure 25:
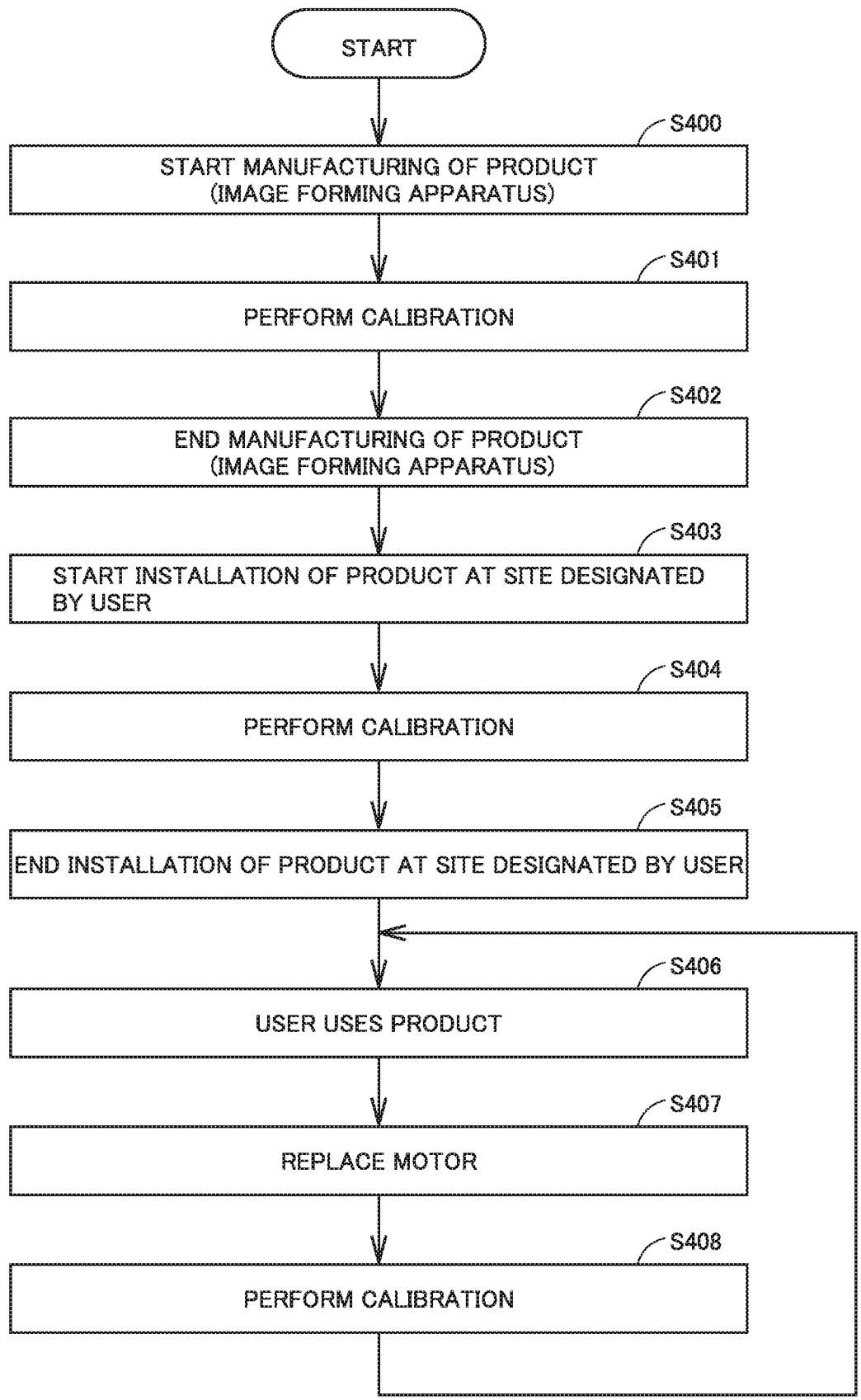
FIG. 25 is a flowchart for illustrating the timing of creating calibration data.

FIG. 25 is a flowchart for illustrating the timing of creating calibration data.

Referring to FIG. 25, it is desirable to create calibration data (S301) in a time period from the start of manufacturing of a product (an image forming apparatus) (S300) to the end of manufacturing of the product (S302). Furthermore, it is desirable to create calibration data (S304) in a time period after the start of installation of the product at a site designated by a user (a user site) (S303) until the end of the installation (S305). Furthermore, it is desirable that the user starts using the product (S306), then the motor is replaced (S307), and thereafter, calibration data is created (S308).

Figure 26:
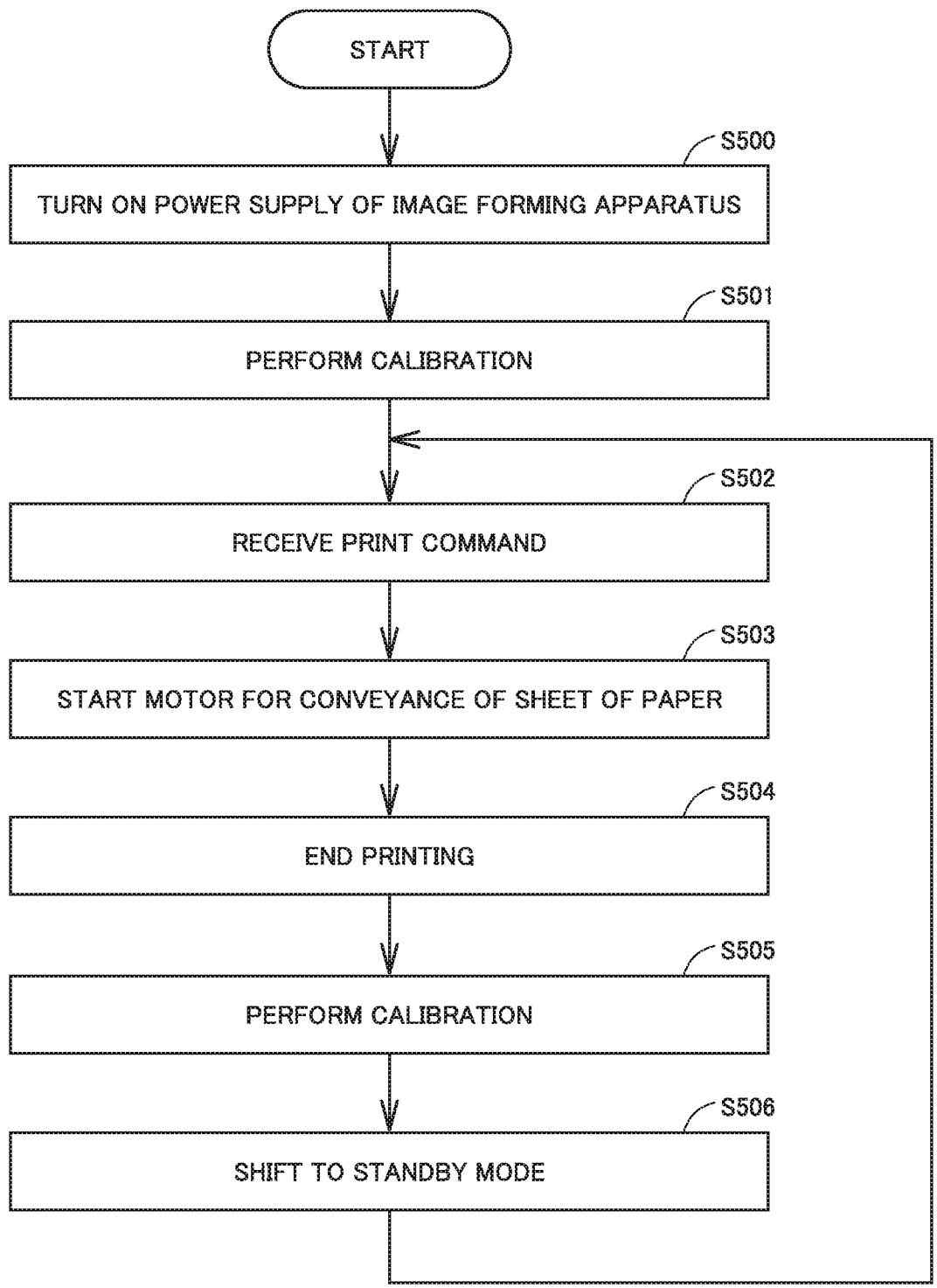

FIG. 26 is a flowchart for illustrating the timing of creating calibration data after a power supply of the image forming apparatus is turned on.

Referring to FIG. 26, after the power supply of the image forming apparatus is turned on (S400), sensorless vector control circuit 50 creates calibration data (S401) until it starts the brushless DC motor for conveying sheets of paper.

Then, sensorless vector control circuit 50 receives a print command from high-order control circuit 60 (S402), and starts the brushless DC motor for conveying the sheets of paper (S403). When printing ends (S404) and a prescribed waiting time has elapsed, high-order control circuit 60 turns off the elements other than a standby power supply to shift to a standby mode (S406) Immediately before shifting to a standby mode, sensorless vector control circuit 50 creates calibration data (S405). This leads to an advantage that a brushless DC motor can be immediately started without having to create calibration data when the standby mode is canceled in response to a print command from high-order control circuit 60.

Although embodiments of the present invention have been described and illustrated in detail, the disclosed embodiments are made for purposes of illustration and example only and not limitation. The scope of the present invention should be interpreted by terms of the appended claims.

What is claimed is:

1. A motor control device that controls a motor of a sensorless type, the motor control device comprising:
   a drive circuit that applies a voltage to each of a plurality of phases of a stator winding of the motor; and
   a controller that controls the drive circuit,
   wherein, when the controller estimates an initial magnetic pole position of a rotor of the motor, the controller:
      while sequentially setting a plurality of energization angles, causes the drive circuit to continuously or intermittently apply an applied voltage to the stator winding at each of the set energization angles, the applied voltage being applied at a voltage value and for an energization time period, and the voltage value and the energization time period being set such that the rotor does not rotate;
      at each of the set energization angles, converts peak values of currents flowing through the phases of the stator winding into a first current component having an electrical angle that is equal to a corresponding one of the set energization angles and a second current component that is different in electrical angle by 90 degrees from the first current component;

calculates a first corrected current component by correcting the first current component based on the second current component; and estimates the initial magnetic pole position of the rotor based on the first corrected current component obtained at each of the set energization angles.

2. The motor control device according to claim 1, wherein estimating the initial magnetic pole position of the rotor includes determining, as an estimated initial position of a magnetic pole of the rotor, an electrical angle at which the first corrected current component obtained at each of the set energization angles attains a maximum value.

3. The motor control device according to claim 1, wherein:

estimating the initial magnetic pole position of the rotor includes determining, as an estimated initial position of a magnetic pole of the rotor, an electrical angle at which an approximate curve becomes a maximum value, the approximate curve approximating a change in the first corrected current component that corresponds to each of the set energization angles, and wherein the approximate curve is a trigonometric function curve having a cycle equal to one electrical cycle of the motor.

4. The motor control device according to claim 1, wherein calculating the first corrected current component includes subtracting the second current component from the first current component at each of the set energization angles.

5. The motor control device according to claim 1, wherein calculating the first corrected current component includes calculating a square root of a sum of a square of the first current component and a square of the second current component at each of the set energization angles.

6. The motor control device according to claim 1, wherein calculating the first corrected current component includes:

calculating an error angle of each of the set energization angles based on the first current component and the second current component at each of the set energization angles;

correcting each of the set energization angles based on the calculated error angle to obtain a corrected energization angle; and based on the corrected energization angle, determining, as the first corrected current component, a value obtained by re-converting the peak values of the currents in the phases into the first current component.

7. An image forming apparatus comprising:

a plurality of rollers that each convey a sheet of paper from a paper feed cassette;

a printer that forms an image on the sheet of paper that is conveyed; and a motor control device that controls a motor that drives at least one of the rollers, the motor being of a sensorless type, wherein the motor control device includes:

a drive circuit that applies a voltage to each of a plurality of phases of a stator winding of the motor; and a controller that controls the drive circuit, and wherein, when the controller estimates an initial magnetic pole position of a rotor of the motor, the controller:

while sequentially setting a plurality of energization angles, causes the drive circuit to continuously or intermittently apply an applied voltage to the stator winding at each of the set energization angles, the applied voltage being applied at a voltage value and for an energization time period, and the voltage value and the energization time period being set such that the rotor does not rotate;

at each of the set energization angles, converts peak values of currents flowing through the phases of the stator winding into a first current component having an electrical angle that is equal to a corresponding one of the set energization angles and a second current component that is different in electrical angle by 90 degrees from the first current component;

calculates a first corrected current component by correcting the first current component based on the second current component; and estimates the initial magnetic pole position of the rotor based on the first corrected current component obtained at a corresponding one of the set energization angles.

8. The image forming apparatus according to claim 7, wherein:

the rollers include:

a first roller that stops in a state where the sheet of paper is held by a roller nip;

a second roller that stops in a state where the sheet of paper comes into contact with an inlet of the roller nip; and a third roller that does not stop in each of the state where the sheet of paper is held by the roller nip and the state where the sheet of paper comes into contact with the inlet of the roller nip, and the motor control device is used to control motors that drive the first roller and the second roller.

9. The image forming apparatus according to claim 8, wherein the motor control device is not used to control a motor that drives the third roller.

10. A method of estimating an initial magnetic pole position of a rotor of a motor that is of a sensorless type, the method comprising:

while sequentially setting a plurality of energization angles, detecting an error angle between each of the set energization angles and an actual energization angle;

while sequentially changing the set energization angles, correcting each of the set energization angles based on the error angle, and continuously or intermittently applying an applied voltage to a stator winding of the motor based on each of corrected ones of the set energization angles, the applied voltage being applied at a voltage value and for an energization time period, and the voltage value and the energization time period being set such that the rotor does not rotate;

at each of the set energization angles, converting peak values of currents flowing through a plurality of phases of the stator winding by application of the applied voltage into a first current component having an electrical angle that is equal to a corresponding one of the set energization angles and a second current component that is different in electrical angle by 90 degrees from the first current component; and estimating the initial magnetic pole position of the rotor based on the first current component that is obtained at each of the set energization angles.

11. The method according to claim 10, wherein the detecting the error angle includes:

while sequentially setting the plurality of energization angles, continuously or intermittently applying an applied voltage to the stator winding at each of the set energization angles, the applied voltage being applied at a voltage value and for an energization time period, and the voltage value and the energization time period being set such that the rotor does not rotate;

at each of the set energization angles, converting peak values of currents flowing through the phases of the stator winding by application of the applied voltage into a first current component having an electrical angle that is equal to a corresponding one of the set energization angles and a second current component that is different in electrical angle by 90 degrees from the first current component; and calculating the error angle based on the first current component and the second current component that are obtained at each of the set energization angles.

12. The method according to claim 10, wherein the detecting the error angle is performed in at least one of:

a case where a product equipped with the motor is manufactured;

a case where the product is installed at a user site; and a case where the motor equipped in the product is replaced.

13. The method according to claim 10, wherein the motor is used to drive a corresponding roller from among a plurality of rollers in an image forming apparatus that forms an image on a sheet of paper conveyed from a paper feed cassette using the rollers, and wherein the detecting the error angle is performed in a time period from when a power supply of the image forming apparatus is turned on to when the motor is started for conveying the sheet of paper.

* * * * *